(12) United States Patent
Irikura

(10) Patent No.: US 7,179,190 B2
(45) Date of Patent: *Feb. 20, 2007

(54) BULL GEAR OF A DIFFERENTIAL GEAR ASSEMBLY

(76) Inventor: Koji Irikura, 1428 Darbec Dr., Morristown, TN (US) 37814

( * ) Notice: Subject to any disclaimer, the term of this patent is extended or adjusted under 35 U.S.C. 154(b) by 0 days.

This patent is subject to a terminal disclaimer.

(21) Appl. No.: 11/417,158

(22) Filed: May 4, 2006

(65) Prior Publication Data

US 2006/0199693 A1 Sep. 7, 2006

Related U.S. Application Data

(63) Continuation of application No. 10/725,598, filed on Dec. 3, 2003.

(51) Int. Cl.
*F16H 48/06* (2006.01)

(52) U.S. Cl. .................................... 475/230
(58) Field of Classification Search ............. 475/220, 475/221, 225, 230, 248
See application file for complete search history.

(56) References Cited

U.S. PATENT DOCUMENTS

| | | | |
|---|---|---|---|
| 1,445,865 A | 2/1923 | Alden | |
| 1,802,545 A | 4/1931 | Acker | |
| 2,608,261 A | 8/1952 | Blazier | |
| 4,480,501 A * | 11/1984 | von Kaler | 475/230 |
| 4,688,962 A | 8/1987 | Koltookian | |
| 5,279,185 A * | 1/1994 | Arnold et al. | 74/606 R |
| 6,338,690 B1 | 1/2002 | Hauser | |
| 6,595,887 B2 | 7/2003 | Thoma | |

FOREIGN PATENT DOCUMENTS

JP 3-79841 4/1991

* cited by examiner

*Primary Examiner*—Ha Ho
(74) *Attorney, Agent, or Firm*—Sterne, Kessler, Goldstein & Fox, P.L.L.C.

(57) ABSTRACT

A lower cost differential gear assembly capable of inputting driving force through a differential gear, whose teeth have sufficient strength is provided. To achieve the object, the differential gear is constructed by engaging a gear part provided with teeth at equal intervals on one of its perimeter surfaces, and a support part pivotally supported by right and left axles through engagement of a spline. Accordingly, the gear part can be formed from a high strength material and the support part can be formed from a lower cost material.

5 Claims, 23 Drawing Sheets

BULL GEAR OF A DIFFERENTIAL GEAR ASSEMBLY

CROSS-REFERENCE TO RELATED APPLICATION

The present application is a Continuation of application Ser. No. 10/725,598, filed Dec. 3, 2003, which is incorporated in its entirety herein by reference thereto.

BACKGROUND OF THE INVENTION

1. Field of the Invention

The present invention relates to a bull gear of a differential gear assembly (a differential bull gear).

2. Related Art

Conventionally, a differential bull gear is made of high-strength metal such as steel or powder metal sintered in high density because its teeth especially require high strength. However, the bull gear entirely made of such high-strength material is expensive.

Therefore, as disclosed in U.S. Pat. Nos. 6,338,690 and 2,608,261, for example, a well-known conventional economical differential bull gear comprises integrally coupled different outer and inner members, wherein an outer member serving as a ring gear is made of high-strength material, and an inner member, a plate which supports a differential pinion, does not require such high strength and may be made of inexpensive material.

However, in this type of bull gear, a problem arises because the two different members coupled together may axially shift from each other so as to hinder proper movement of the differential gear assembly.

The differential bull gear disclosed in U.S. Pat. No. 6,338,690 avoids the axially positional difference between the inner and outer members by inserting corners of the square thin inner member into corresponding recesses formed in the inner peripheral portion of the outer member serving as a ring gear. However, the thin inner member supporting just a differential pinion is so separated from a pair of axles as to make it difficult to fix the axles in axial location when differential side gears fixed on the respective axles mesh with the differential pinion.

Therefore, a differential housing is divided into halves along the bull gear so that the differential housing halves sandwich the bull gear. Each of the differential housing halves is partly extended to fill gaps between the square inner plate and the ring gear so as to reinforce the bull gear and enhance efficiency of torque transmission between the ring gear and the inner plate. However, each of the differential housing halves having such a complicated shape and requiring high-dimensional accuracy may be expensive, and the differential gear assembly is complicated in its assembly.

In the differential bull gear disclosed in the U.S. Pat. No. 2,608,261, the inner member supporting the differential pinion and supported on axles has a circular contour, when axially viewed, so that the peripheral surface thereof entirely contacts a inner peripheral surface of the outer member serving as a ring gear. Both members are prevented from relative rotation by tightening some screws, and both contact heads of the screws so as to be prevented from axially relative shifting.

However, each of female screws for the screws is divided into halves. The female screw halves are formed on the inner peripheral surface of the outer member and the outer peripheral member of the inner member, respectively. The inner and outer members should be accurately located in their relatively rotational and axial directions so as to form the female screws. Since the half-divided female screws require complicated processing and location, and high accuracy, the resultant bull gear may be expensive. If the bull gear is simplified by decreasing the screws and female screws, efficiency of torque transmission between the inner and outer members is reduced, and the screws are further stressed so as to be damaged, causing rotational and axial moving of the inner and outer members.

BRIEF SUMMARY OF THE INVENTION

A main object of the present invention is to provide an economical bull gear of a differential gear assembly (a differential bull gear) simplified in assembly and location while keeping sufficient strength of its toothed portion as an input gear for receiving torque from a transmission.

To achieve the object, a differential bull gear according to the present invention comprises a ring gear for inputting torque from a transmission, and a support member supporting a differential pinion and supported on an axle. The support member transmits the torque from the ring gear to the axle through the differential pinion. The ring gear and the support member are toothed to be coupled together so as to be relatively axially shiftable and not-relatively rotatable. The ring gear made of high-strength material such as steel or sintered powder metal is sufficiently strong to act as the input gear for receiving torque from a transmission. The support member allowed to be lower in strength than the ring gear is made of sintered powder metal, plastics, die-cast metal, or the like, thereby being inexpensive.

In one aspect, the ring gear preferably has a toothed outer periphery and a toothed inner periphery. One of the toothed outer and inner peripheries serves as an input gear for receiving torque from the transmission. The other of the toothed outer or inner periphery meshes with the toothed portion of the support member so as to couple the ring gear with the support member.

Alternatively, in another aspect, the ring gear preferably has a toothed outer periphery and a toothed inner periphery. Either the toothed outer or inner periphery serves as an input gear for receiving torque from the transmission. Both toothed outer and inner peripheries mesh with the toothed portion of the support member so as to couple the ring gear with the support member.

In this aspect, the support members has an annular recess into which the ring gear is fitted. The recess has a toothed outer periphery and a toothed inner periphery for meshing with the toothed outer and inner peripheries of the ring gear, respectively.

A second object of the present invention is to provide the bull gear with the support member and the ring gear prevented from relatively axially moving by simple configuration.

As an aspect, the above-mentioned support member, is preferably divisible into halves, each half having an annular recess. The halves are joined to each other so as to fit the ring gear in the mutually facing recesses, thereby forming the support member holding the ring gear.

As an aspect, while the ring gear has a first surface perpendicular to the axle and the support member has a second surface to be leveled with the first surface of the ring gear, a retaining member abuts against the first and second surfaces so as to prevent the ring gear and the support member from relatively axial moving. The retaining member may be provided on a pinion shaft supporting a pinion for transmitting torque from the transmission to the ring gear. Alternatively, the retaining member may be a washer provided on a screw screwed into either the ring gear or the support member. If the outer member is divided into a plurality of pieces, a plurality of the retaining members may be provided to the respective pieces of the outer member.

These, other and further objects, features and advantages of the invention will appear more fully from the following description taken in connection with the accompanying drawings.

BRIEF DESCRIPTION OF THE DRAWINGS/FIGURES

DETAILED DESCRIPTION OF THE INVENTION

Figure 1:
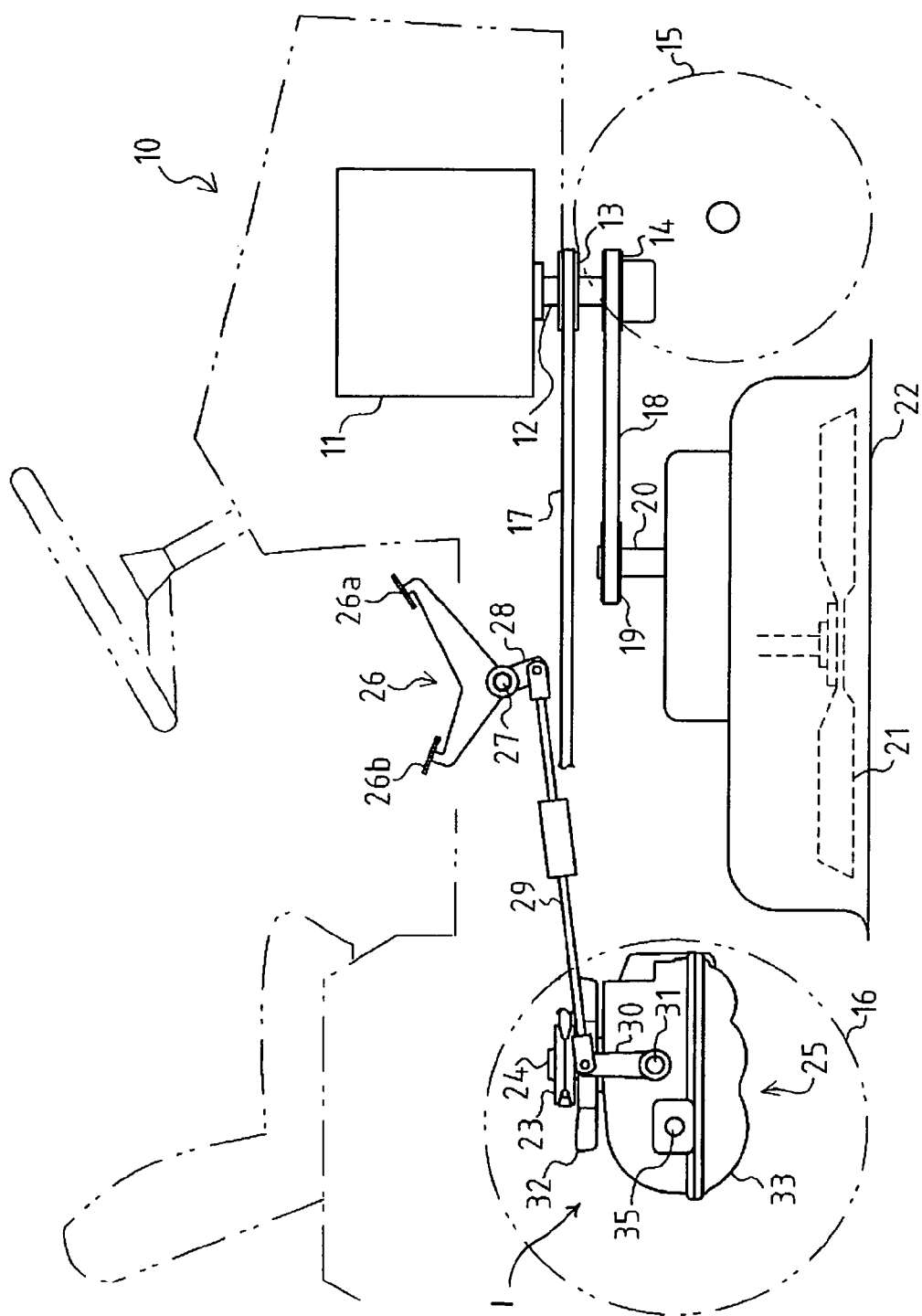
FIG. 1 is a side view of a mower tractor equipped with a transaxle.

As an example of a vehicle equipped with a differential gear assembly, as shown in FIG. 1, a mower tractor 10 is provided at its rear portion with a transaxle 1, incorporating a differential gear assembly differentially supporting right and left axles 35. Right and left rear wheels 16 are fixed onto outer ends of the axles 35, and right and left front wheels 15 are suspended at a front portion of the mower tractor 10. An engine 11 is mounted above the front wheels 15. The engine 11 has a downwardly vertical output shaft 12 with a pulley 13 fixed thereon. The transaxle 1 has an upwardly vertical input shaft 24 with a pulley 23 fixed thereon.

Figure 2:
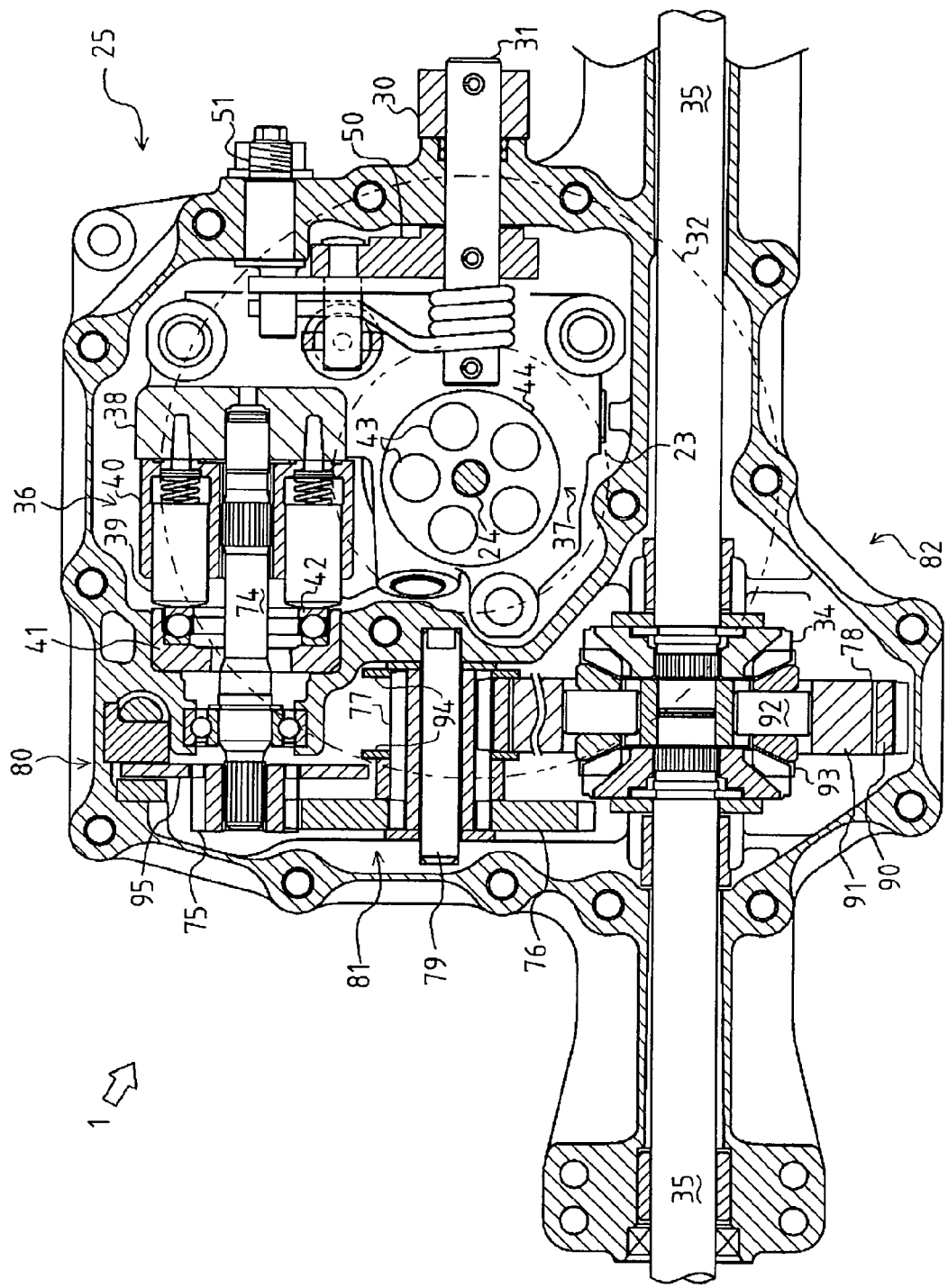
FIG. 2 is a sectional plan view of the transaxle incorporating a differential gear assembly including a differential bull gear according to a first embodiment of the present invention.
Figure 3:
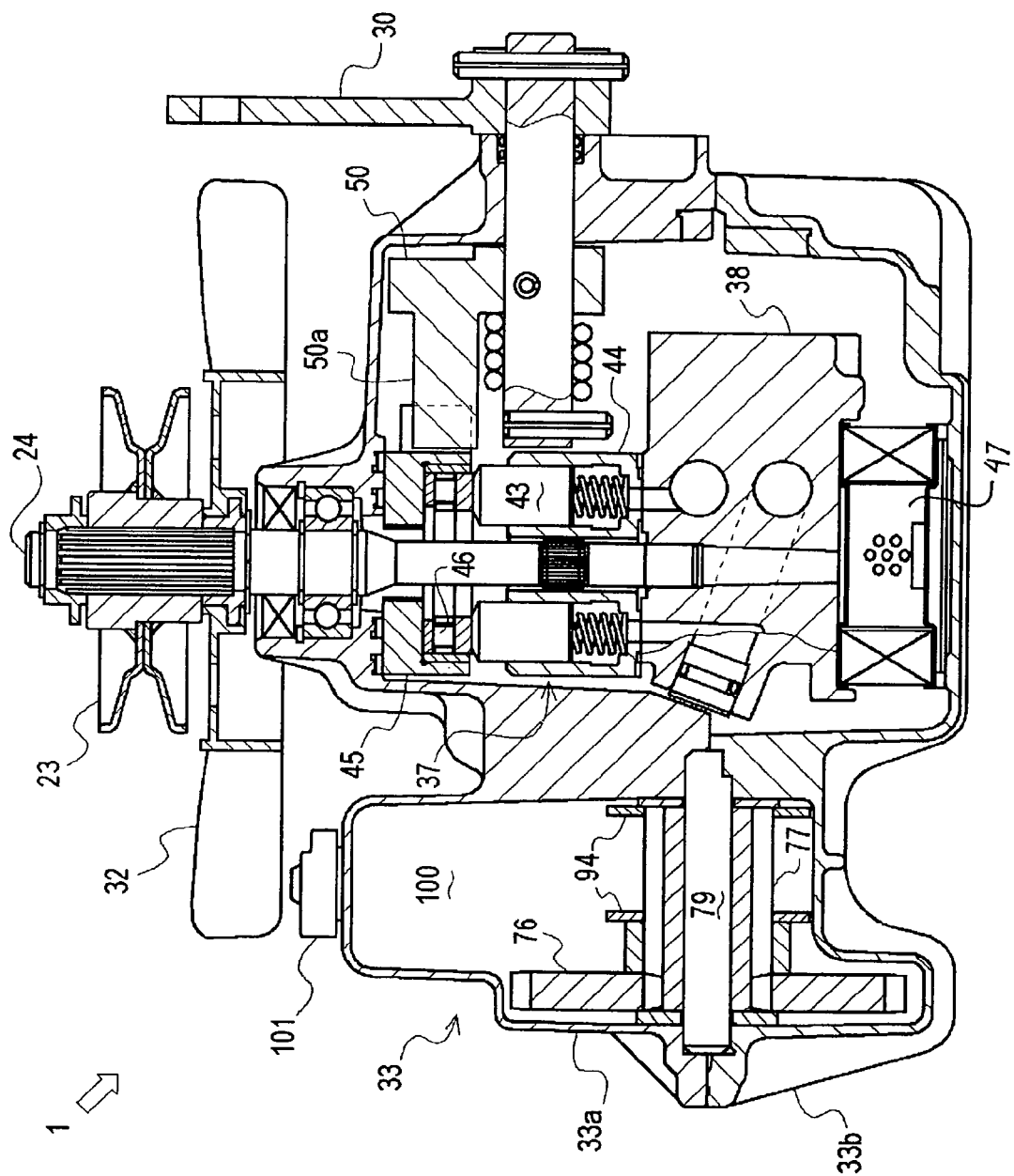
FIG. 3 is a sectional rear view of the transaxle.

A drive belt 17 is wound around the pulleys 13 and 23 so as to transmit driving force from the engine 11 to the input shaft 24 of the transaxle 1. As shown in FIGS. 2 and 3, the transaxle 1 incorporates a hydraulic stepless transmission (hereafter, a HST) 25, a reduction gear assembly 81 and a differential gear assembly 82. The driving force of the input shaft 24 is transmitted to the right and left axles 35 through the HST 25, the reduction gear assembly 81, and the differential gear assembly 82, thereby rotating the rear wheels 16.

The mower tractor 10 is provided with an accelerator 26 comprising a front pedal 26a and a rear pedal 26b, which are connected integrally so as to be rotatable like a seesaw centered on a horizontal pivot shaft 27. The mower tractor 10 travels forward by pressing the pedal 26a and travels rearward by pressing the pedal 26b.

An arm 28 is fixed to the accelerator 26 so as to be rotatable around the pivot shaft 27. The arm 28 is pivotally connected to a speed change lever 30 through a rod 29. The speed change lever 30 is fixed onto a horizontal operation shaft 31 extended outward from the HST 25. Therefore, depression of either the front or rear pedal 26a or 26b is transmitted to the operation shaft 31 of the HST 25.

A mower deck 22 incorporating a rotary blade 21 for cutting grass is disposed below the center portion of the vehicle body. A pulley 14 is also fixed on the output shaft 12 of the engine 11, and a pulley 19 is fixed on an input shaft 20 extended upward from the mower deck 22. A drive belt 18 is wound around the pulleys 14 and 19 so as to transfer driving force from the engine 11 into the mower deck 22, thereby rotating the rotary blade 21.

The transaxle 1 will be explained with reference to FIGS. 2 and 3. The transaxle 1 comprises a housing 33, which is dividable into an upper housing member 33a and a lower housing member 33b. The housing 33 incorporates the HST 25, a brake assembly 80, the reduction gear assembly 81 and the differential gear assembly 82. The HST 25 comprises a hydraulic motor 36, a hydraulic pump 37, a center section 38 and others.

The vertical input shaft 24 is extended above the housing 33. The pulley 23 and a cooling fan 32 are fixed on the upward extended portion of the input shaft 24 above the housing 33.

The input shaft 24 serves as a pump shaft of the hydraulic pump 37 so that, by rotating the input shaft 24, the hydraulic pump 37 supplies hydraulic oil to the hydraulic motor 36.

The variable displacement hydraulic pump 37 comprises a cylinder block 44 and a movable swash plate 45. In the cylinder block 44 is disposed the axial pump shaft 24 and vertically slidable pistons 43. The movable swash plate 45 is integrally provided with a thrust bearing 46 abutting against the pistons 43. The movable swash plate 45 has an arcuately curved surface 45a (see FIG. 16) slidably fitted to the housing 33.

In the housing 30, a connection arm 50 with a horizontal projection 50a inserted into the movable swash plate 45 is fixed on the operation shaft 31. By rotating the speed change lever 30, the operation shaft 31 and the connection arm 50 are rotated integrally with the lever 30, thereby changing a tilt angle (and direction) of the movable swash plate 45 so as to change the amount and direction of oil discharged from the hydraulic pump 37 to the hydraulic motor 36.

An adjuster 51 for adjusting the neutral position of the connection arm 50 is attached to the housing 33 so as to correct the neutral position of the movable swash plate 45.

Figure 15:
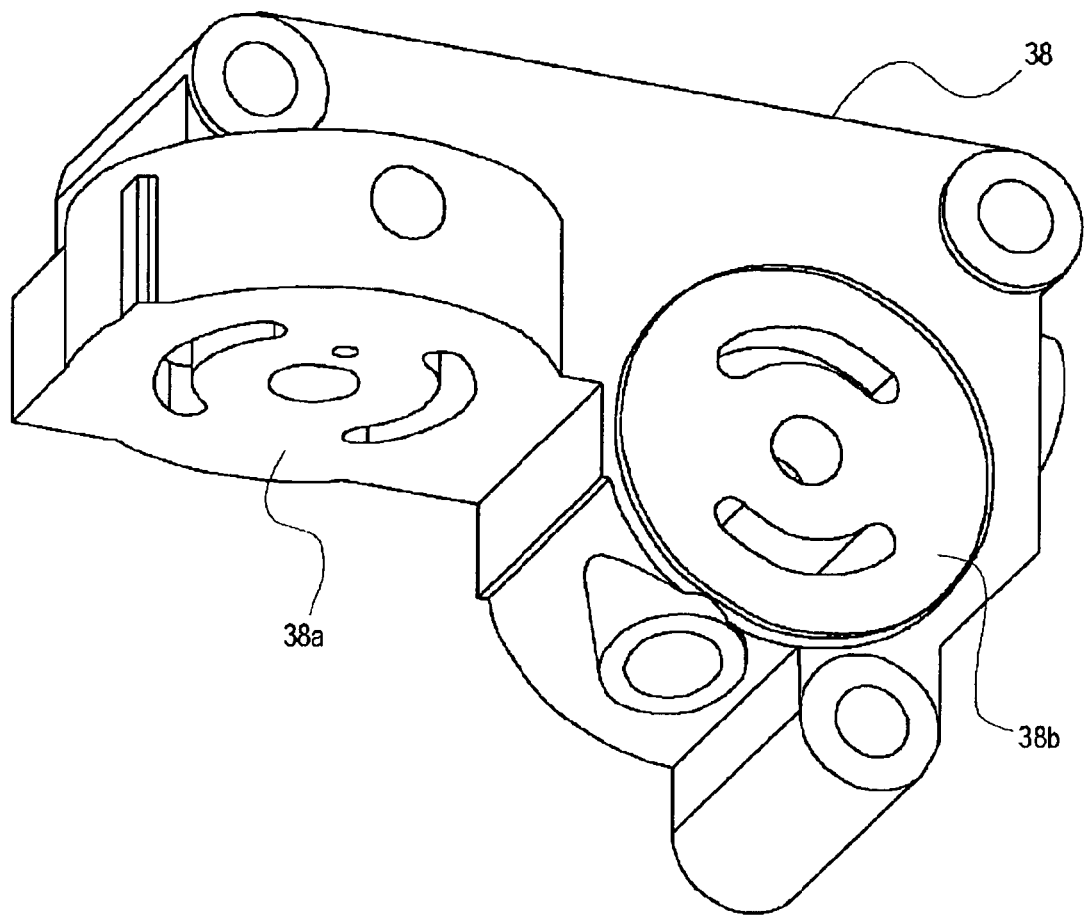
FIG. 15 is a perspective view of a center section for a hydraulic stepless transmission in the transaxle shown in FIGS. 2 and 3.

The center section 38 is fastened to the housing 33 by bolts so as to be apart from the bottom of the housing 33. An oil filter 47 is disposed between the center section 38 and the bottom of the housing 33. The center section 38 having a horizontal pump mounting surface 38b and a vertical motor mounting surface 38a (see FIG. 15) is arranged in the housing 33 so as to place the pump mounting surface 38b between the axle 35 and the motor mounting surface 38a. The vertically axial cylinder block 44 of the hydraulic pump 37 is slidably and rotatably fitted onto the pump mounting surface 38b, and a horizontally axial cylinder block 40 of the hydraulic motor 36 is slidably and rotatably fitted onto the motor mounting surface 38a.

The fixed displacement hydraulic motor 36 comprises the cylinder block 40 with horizontal pistons 39 inserted therein, and a fixed swash plate 41. A thrust bearing 42 is integrally provided in the swash plate 41 so as to abut against the pistons 39.

The hydraulic motor 36 has a horizontal motor shaft 74 disposed parallel to the axles 35. The motor shaft 74 axially and not-relatively rotatably penetrates the cylinder block 40. The motor shaft 74 is extended from the cylinder block 40 and freely passed through the swash plate 41, and a gear 75 is fixedly provided thereon. Accordingly, output from the hydraulic motor 36 is transmitted to the gear 75. The brake assembly 80 is provided around the gear 75 so as to apply braking force onto the motor shaft 74.

A counter shaft 79 is supported between an outer wall and a partition of the housing 33. An axially long and diametrically small pinion 77 rotatably fitted on the shaft 79, and a diametrically large gear 76 not-relatively rotatably fitted on the pinion 77 constitute the reduction gear assembly 81. The gear 76 meshes with the gear 75, and the pinion 77 meshes with a differential bull gear 78 of the differential gear assembly 82. Thus, the reduction gear assembly 81 transmits output of the hydraulic motor 36 to the differential gear assembly 82.

The differential gear assembly 82 differentially rotates the right and left axles 35. The right and left axles 35 are rotatably supported by the rear portion of the housing 33, and extended outward therefrom. The rear wheels 16 are fixed onto distal ends of the axles 35.

As described above, output of the engine 11 is transmitted to the right and left axles 35 through the HST 25, the reduction gear assembly 81, and the differential gear assembly 82, thereby rotating the rear wheels 16.

As shown in FIG. 3, in the housing 33, a vacant space above the gear on the counter shaft 79 serves as an oil tank 100. A breather 101 is disposed on an upper surface of the housing 33 above the oil tank 100, as described below.

The differential gear assembly 82 will now be explained. As shown in FIG. 2, bevel side gears 34 are fixed on proximal portions of the right and left coaxial axles 35. The bull gear 78 disposed between the bevel side gears 34 meshes with the pinion 77 so as to serve as an input gear of the differential gear assembly 82. The bull gear 78 has an axial center hole 91a into which proximal ends of the axles 35 are relatively rotatably inserted so as to support the bull gear 78.

At least one differential bevel pinion 93 is rotatably supported in the bull gear 78 through a pinion shaft 92, and meshes with the right and left side gears 34 so as to differentially transmit torque of the bull gear 78 to the axles 35.

Figure 4:
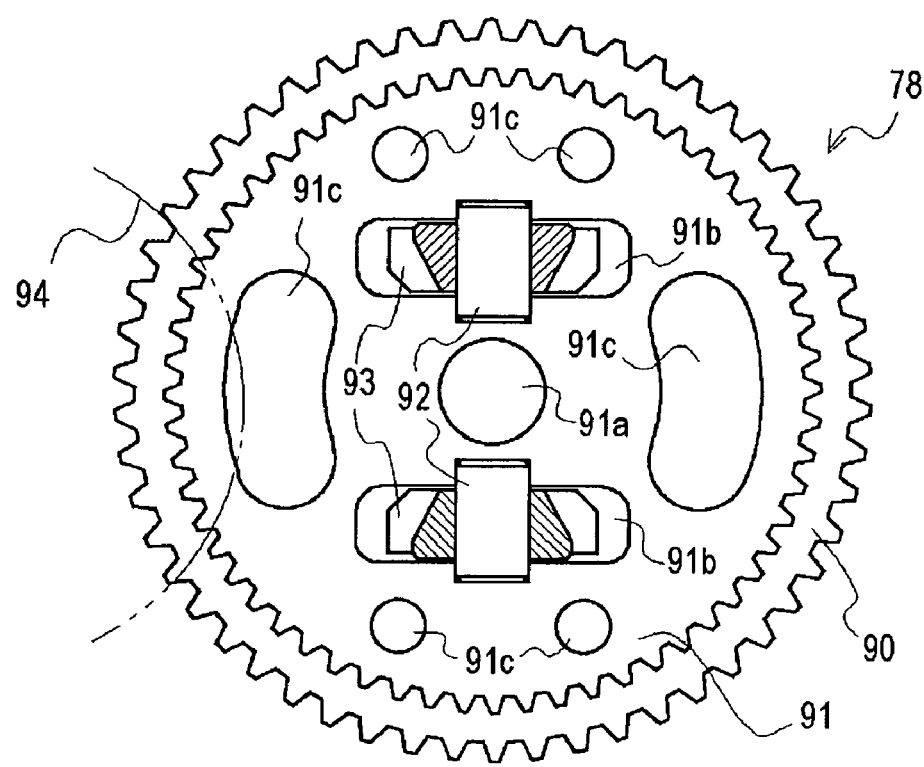
FIG. 4 is a side view of the differential bull gear according to the first embodiment.
Figure 5:
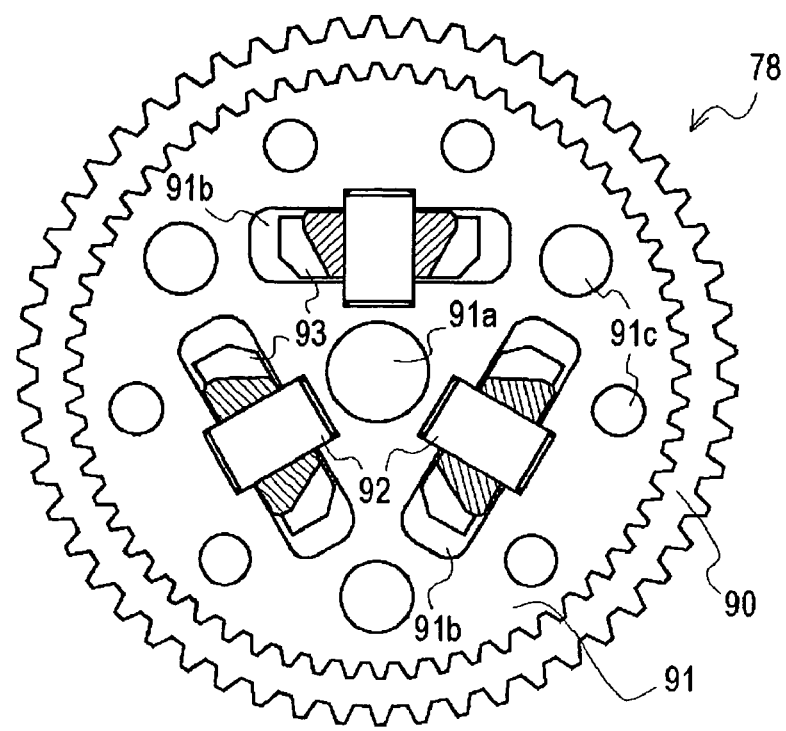
FIG. 5 is a side view of a differential bull gear according to a second embodiment of the present invention.

The differential bull gear 78 will be explained. As shown in FIGS. 4 and 5, the differential bull gear 78 comprises an outer ring gear part 90 and an inner support part 91. The ring gear part 90 has an outer peripheral gear to mesh with the pinion 77, and also has an inner peripheral gear. The support part 91 has an outer peripheral gear, which meshes with the inner peripheral gear of the ring gear part 90, so that the ring gear part 90 and the support part 91 are not-relatively rotatably but they are relatively axially slidably joined with each other. In other words, the ring gear part 90 and the support part 91 are relatively axially slidable so as to be separated from each other.

The axial center hole 91a into which the proximal ends of the axles 35 are inserted is formed in the support part 91. The support part 91 also has at least one hole 91b in which the pinion shaft 92 is supported and the pinion 93 on the shaft 92 is allowed to rotate.

The support part 91 of the bull gear 78 with two pinions 93 as a first embodiment shown in FIG. 4 is provided with two holes 91b for the respective pinions 93 and shafts 92. The two holes 91b, and the shafts 92 with pinions 93 therein are symmetrical with respect to the axial center hole 91a (the axles 35). The support part 91 of the bull gear 78 with three pinions 93 as a second embodiment shown in FIG. 5 is provided with three holes 91b for the respective pinions 93 and shafts 92. The three holes 91b, and the shafts 92 with the pinions 93 therein are arranged regular-triangularly around the axial center hole 91a (the axles 35).

As shown in FIGS. 4 and 5, vacant holes 91c for weight-reduction may be suitably provided in the support part 91 in addition to the axial center hole 91a and the holes 91b.

As shown in FIG. 2, on the counter shaft 79 are axially-immovably fitted right and left radial retaining rings 94 through the pinion 77 so as to abut against right and left side surfaces of the ring gear part 90 and the support part 91, respectively. The right and left side surfaces of the ring gear part 90 are leveled with the right and left side surfaces of the support part 91, respectively, so as to surely abut against the respective retaining rings 94. Therefore, the right and left retaining rings 94 sandwich the bull gear 78 while preventing the ring gear part 90 and the support part 91 from relatively axially shifting.

The ring gear part 90 is made from high-strength metal material, such as forged steel or high-density sintered powder metal. The support part 91 may be made from economical material, such as plastics, die-cast metal, or low-density sintered powder metal, having lower strength than the ring gear part 90. Accordingly, the differential bull gear 78 may be reduced in cost while keeping the required strength for its teeth to perform as an input gear receiving torque from the reduction gear assembly 81. Further, the ring gear part 90 and the support part 91 are joined together through their meshing teeth so as to ensure sufficient transmission of torque therebetween.

Figure 6:
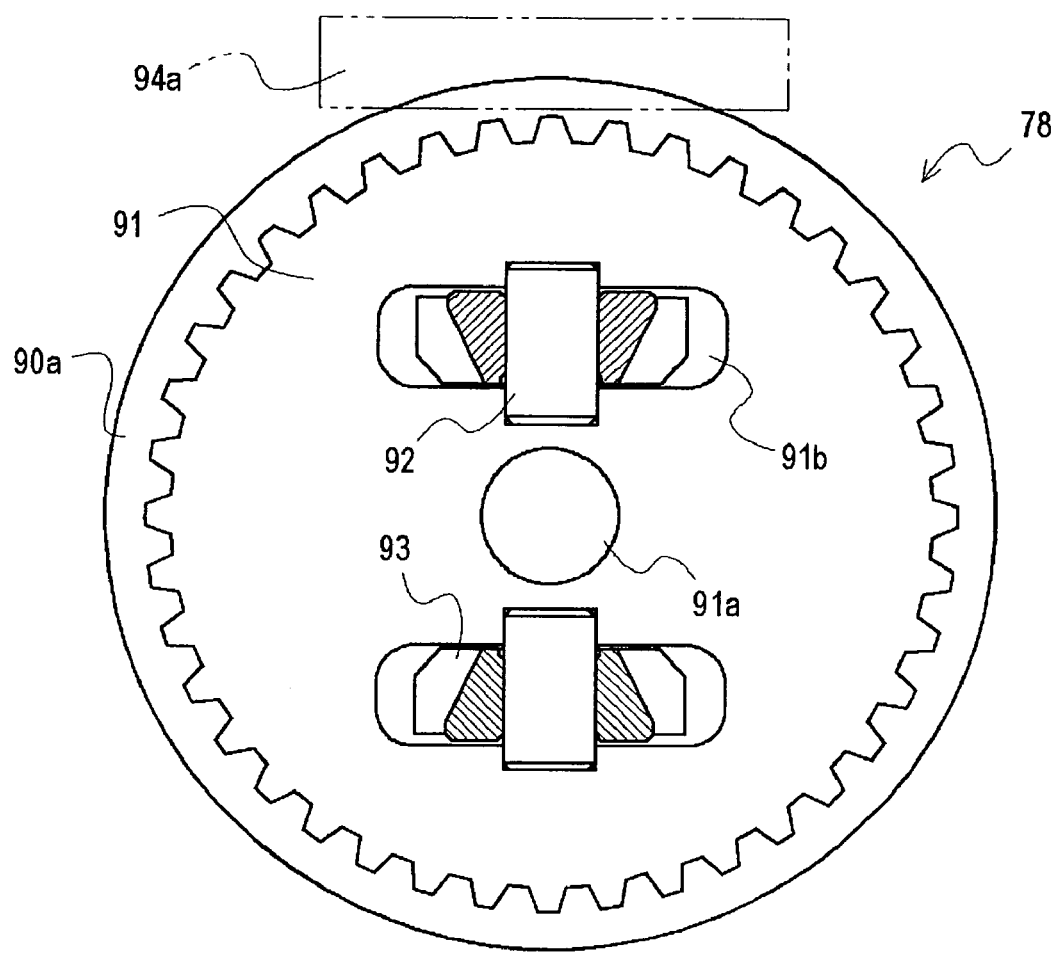
FIG. 6 is a side view of a differential bull gear according to a third embodiment of the present invention.
Figure 7:
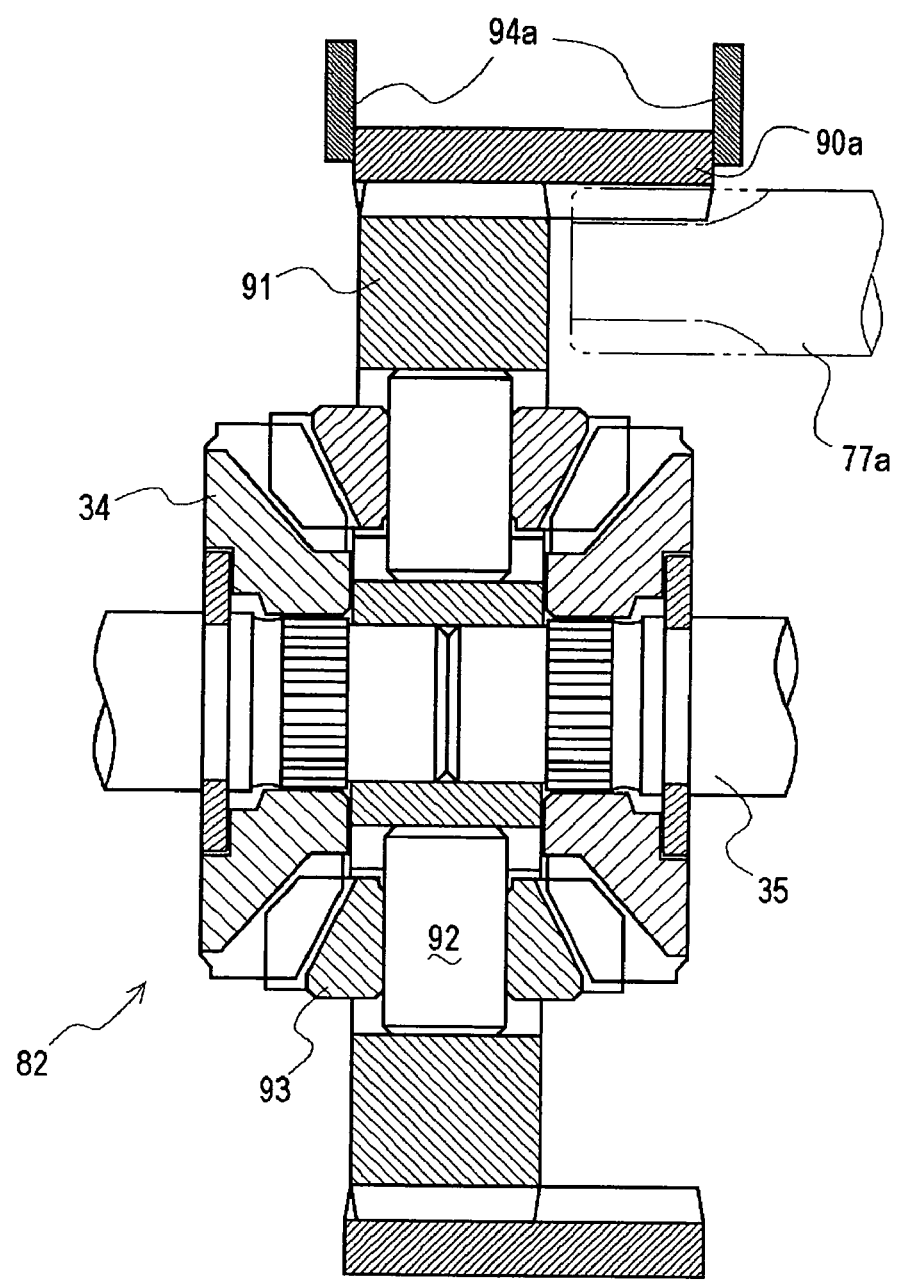
FIG. 7 is a sectional plan view of a differential gear assembly including the differential bull gear according to the third embodiment.

A third embodiment of the differential bull gear 78 shown in FIGS. 6 and 7 will be explained. While the inner support part 91 with the pinions 93 is identical or similar to that of FIG. 4 or 5, a reshaped outer ring gear part 90a is axially longer than the inner support part 91. The ring gear part 90a has no outer peripheral gear but an inner peripheral gear, which meshes with the outer peripheral gear of the support part 91 and a pinion 77a, as shown in FIG. 7. A tip of a pinion shaft on which the pinion 77a is provided (integrally formed) is disposed in parallel to the axles 35 and laterally sidewise from the support part 91 so that the pinion 77a meshes with the inner peripheral gear of the ring gear part 90a so as to transmit output torque of the hydraulic motor 36 to the ring gear part 90a. The transaxle 1 needs to be modified corresponding to this side-by-side arrangement of the differential bull gear 78 and pinion 77a. The suitably modified transaxle 1 may have a reduced distance between the motor shaft 74 and the differential bull gear 78 so its dimensions perpendicular to axles 35 may be minimized.

A pair of left and right retaining plates 94$a$ are fixed to an inner wall of the housing 33 or the like and contact the right and left surfaces of the outer ring gear part 90. The inner support part 91 is axially restricted when it is supported on the axles 35, and the left and right retaining plates 94$a$ prevent the outer ring gear part 90 from axially moving relative to the inner support part 91.

Figure 8:
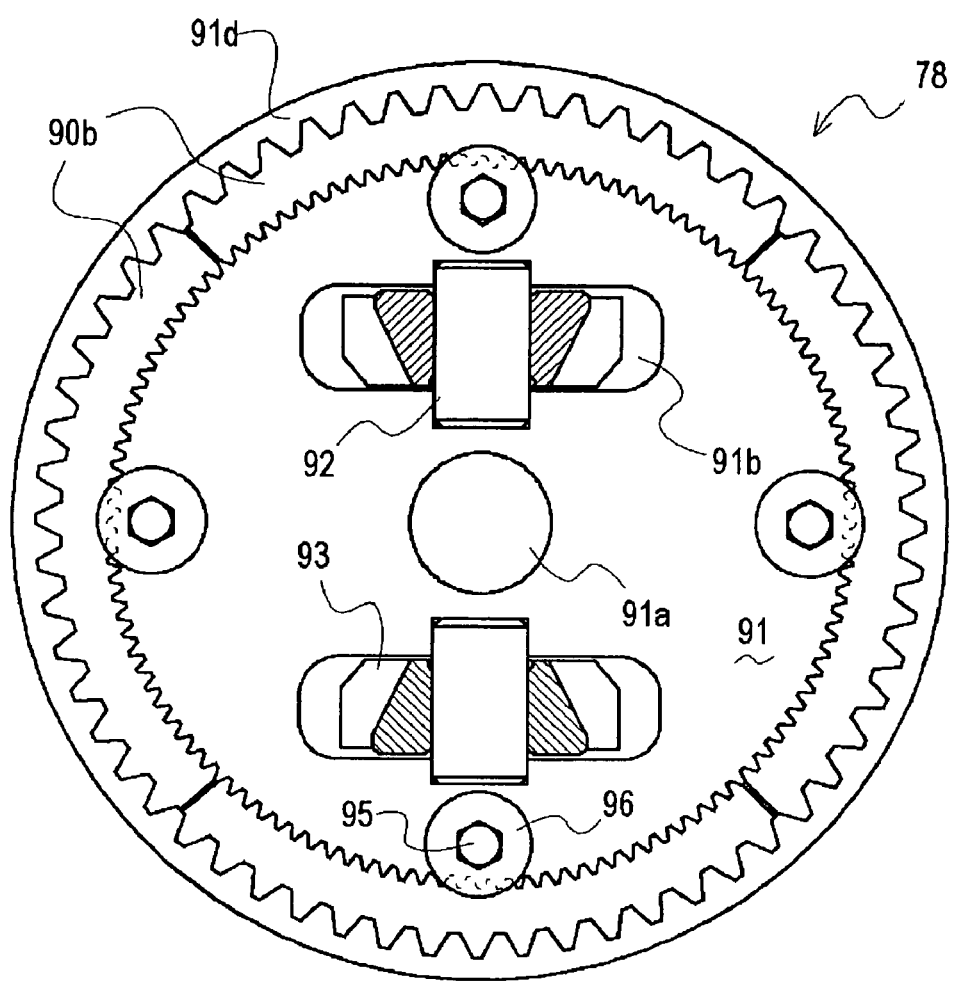
FIG. 8 is a side view of a differential bull gear according to a fourth embodiment of the present invention.

A fourth embodiment of the differential bull gear 78 shown in FIGS. 8 and 9 will be explained. The ring gear part 90 has an outer peripheral gear to mesh with the pinion 77, and an inner peripheral gear meshing with an outer peripheral gear of the support part 91. As shown in FIG. 8, the ring gear part 90 is divisible into a plurality of arcuate pieces (in this embodiment, four equal pieces) 90$b$ in its peripheral direction. The dividable ring gear part 90, while being made of expensive high-strength material, is advantageous in maintenance and cost-saving because only the damaged piece 90$b$ can be exchanged or repaired. The support part 91 supports the pinions 93 and is supported on the axles 35 similar to the above description.

Figure 9:
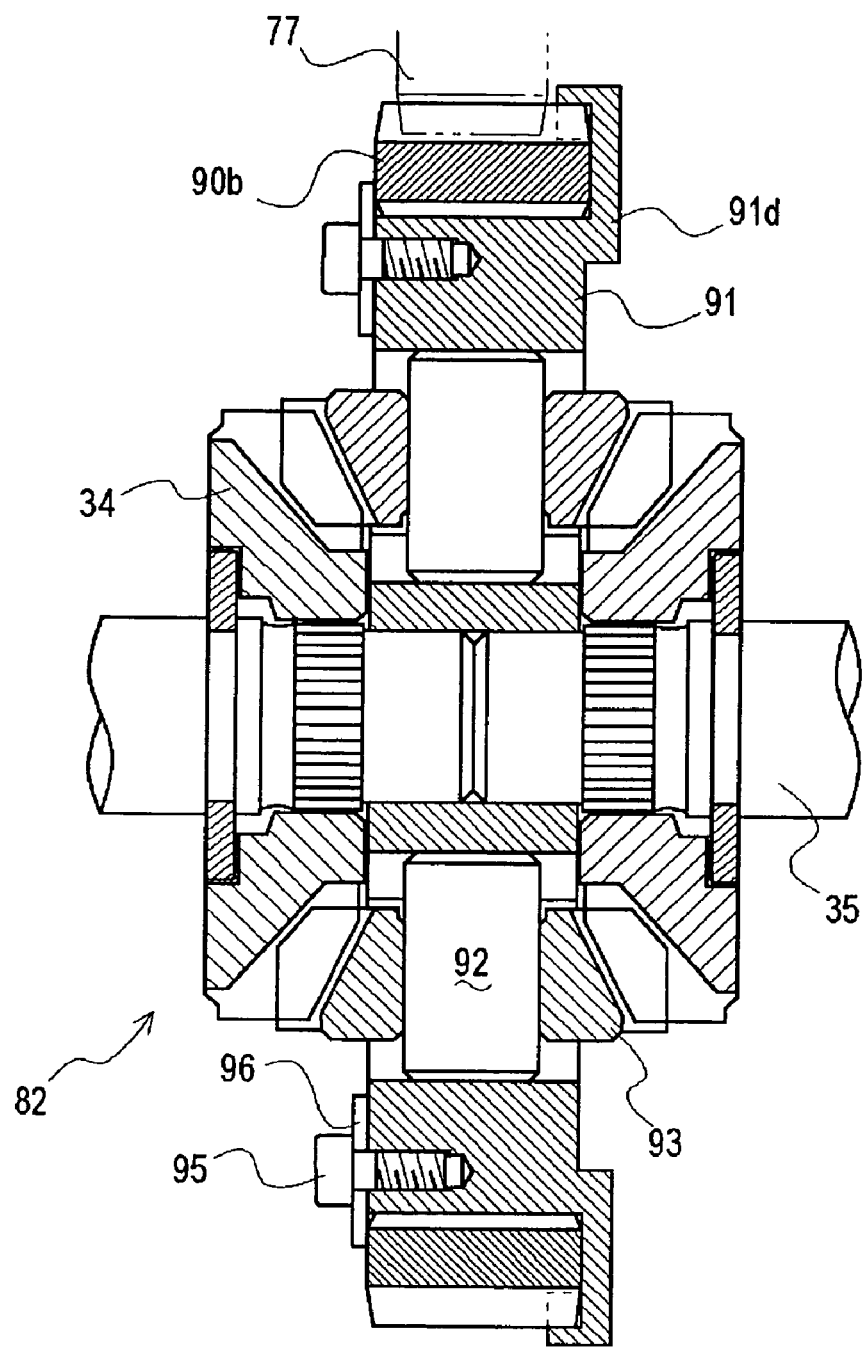
FIG. 9 is a sectional plan view of a differential gear assembly including the differential bull gear according to the fourth embodiment.

As shown in FIG. 9, from the right surface of the support part 91 is extended a retaining portion 91$d$ along the right surface of the ring gear part 90, thereby preventing the ring gear part 90 (i.e., all of the pieces 90$b$) from axial rightward movement relative to the support part 91. The retaining portion 91$d$ is toothed to mesh with the right end of the outer peripheral gear of the ring gear part 90, thereby further surely retaining the ring gear part 90.

Screws 95 with washers 96 are screwed into the support part 91 so that heads of the screws 95 and the washers 96 are disposed on the left surface of the support part 91. The screws 95 with the washers 96 are as many as the divisional pieces 90$b$ so that each of the washers 96 contacting the left surface of the support part 91 also contacts the left surface of each piece 91$b$ so as to prevent each piece 91$b$ from axial leftward movement.

Accordingly, the washers 96 and the retaining portion 91$d$ of the support part 91 prevent all of the pieces 90$b$ of the ring gear part 90 from axial movement relative to the support part 91. The cross-section of the retaining portion 91$d$ of the support part 91 and the screws 95 with the washers 96 in this embodiment are shown for convenience. It is only important that the washer 96 and the retaining portion 91$d$ are axially opposed with the bull gear 78 therebetween.

Figure 10:
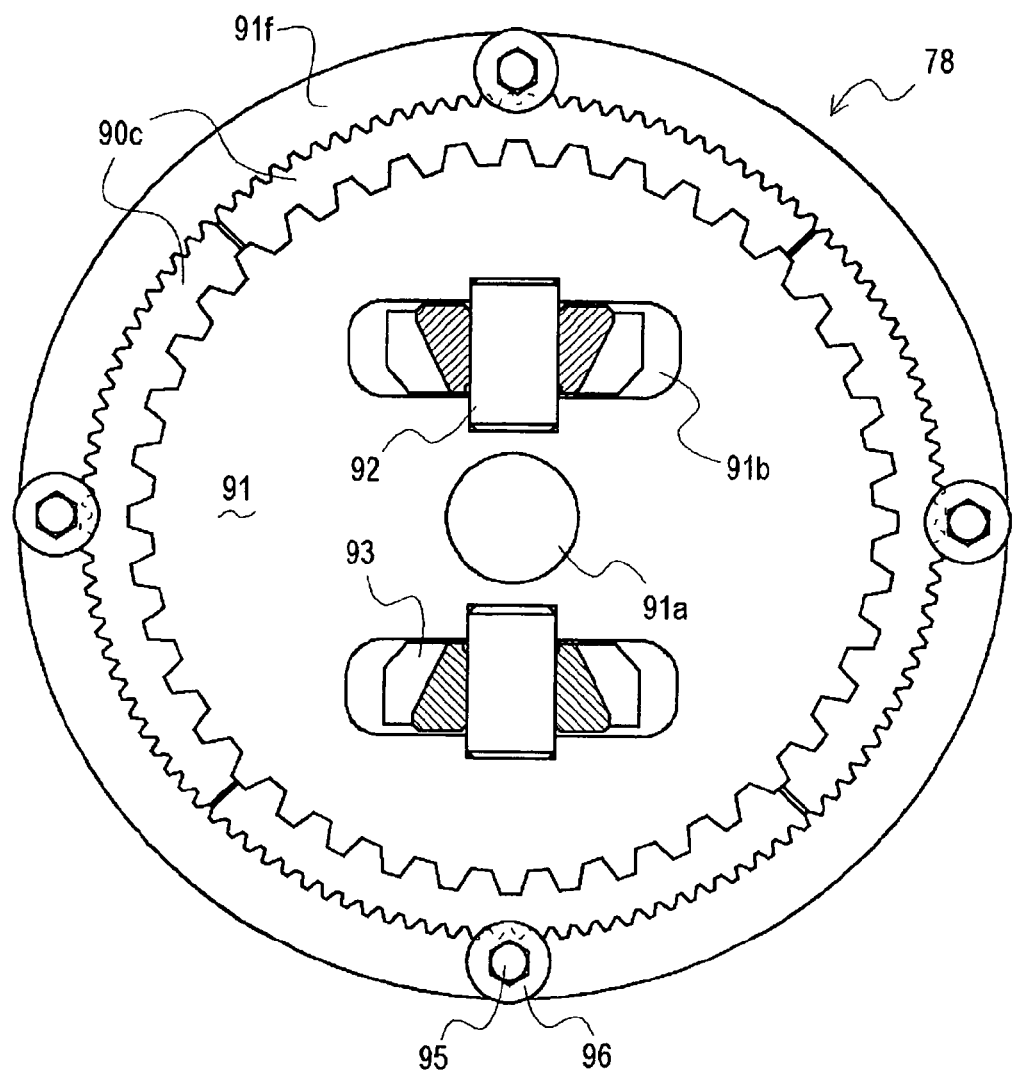
FIG. 10 is a side view of a differential bull gear according to a fifth embodiment of the present invention.
Figure 11:
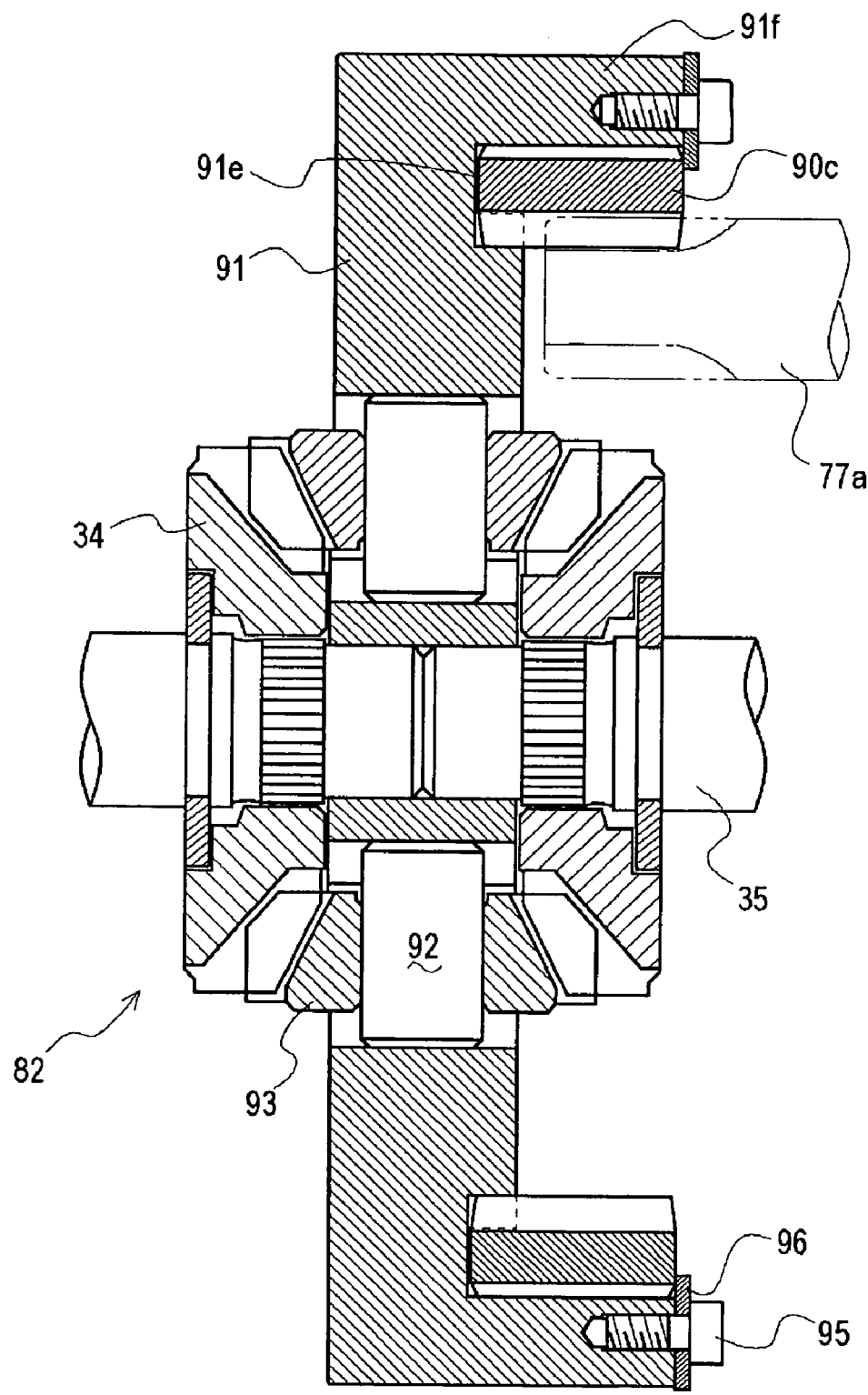
FIG. 11 is a sectional plan view of a differential gear assembly including the differential bull gear of the fifth embodiment.

A fifth embodiment of the different bull gear 78 shown in FIGS. 10 and 11 will be explained. The support part 91 in this embodiment is radially extended so that the major radius (the distance from the axis of the axles 35) of the support part 91 is longer than the major radius of the ring gear part 90. The ring gear part 90 is divisible into a plurality of pieces 90$c$, similar to that of the fourth embodiment shown in FIGS. 8 and 9. The support part 91 has a main portion supporting the pinions 93 and supported on the axles 35. The support part 91 is provided on one side surface thereof with an annular recess 91$e$ surrounding the main portion. The ring gear part 90 is (the pieces 90$c$ are) inserted at one axial end thereof into the annular recess 91$e$. The support part 91 has an outer peripheral portion 91$f$ axially extended so as to entirely cover the outer peripheral surface of the ring gear part 90, as shown in FIG. 11. The axial end surface of the ring gear part 90 (the pieces 90$c$) located opposite to the recess 91$e$ is leveled with the extended axial end surface of the outer peripheral portion 91$f$.

In the support part 91, a step between the main portion and the recess 91$e$ and a step between the recess 91$e$ and the outer peripheral portion 91$f$ are toothed to mesh with inner and outer peripheral gears of the ring gear part 90 (pieces 90$c$), respectively. The axial end side surface of the support part 91 in the recess 91$e$ restricts further axial movement of the ring gear part 90 toward the support part 91. The inner peripheral gear teeth of the ring gear part 90 (pieces 90$c$) also mesh with the pinion 77$a$ similar to that of the third embodiment shown in FIG. 7.

Screws 95 with washers 96 are axially screwed into the outer peripheral portion 91$f$ of the support part 91. The screws 95 with the washers 96 are as many as the divisional pieces 90$c$ so that each of the washers 96 contacts both the leveled axial end surfaces of the outer peripheral portion 91$f$ and each piece 90$c$ so as to prevent each piece 90$c$ from axial movement apart from the support part 91.

Accordingly, the support part 91 and the washers 96 prevent all of the pieces 90$c$ of the ring gear part 90 from axial movement relative to the support part 91.

Figure 12:
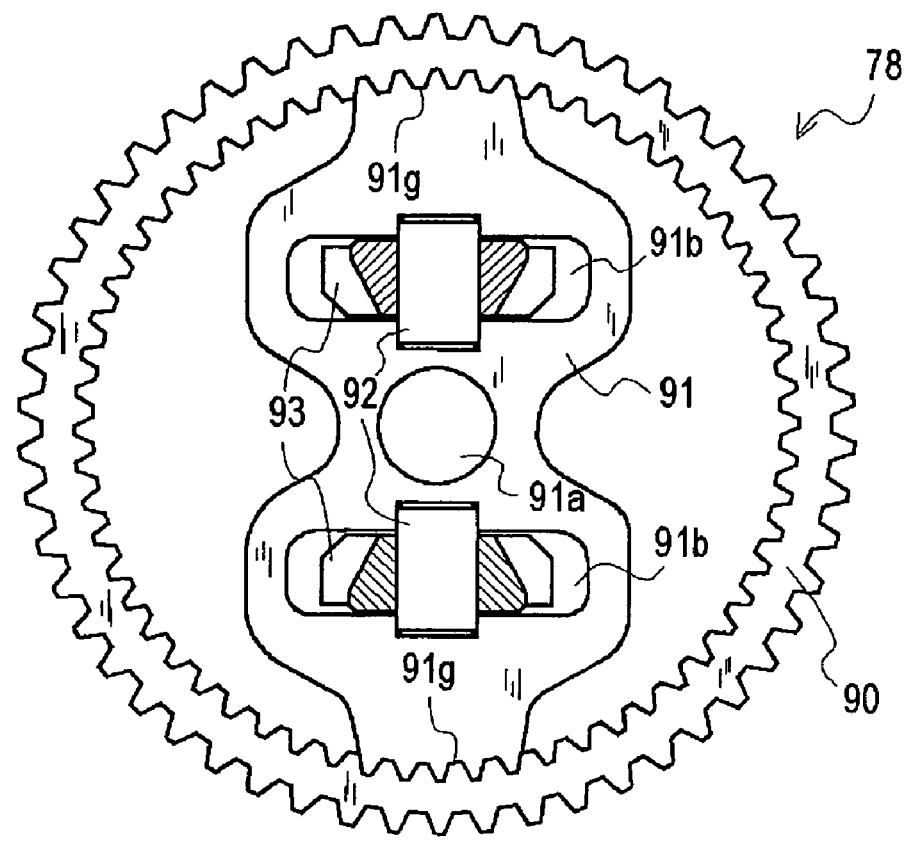
FIG. 12 is a side view of a differential bull gear according to a sixth embodiment of the present invention.

A sixth embodiment of the differential bull gear 78 shown in FIG. 12 will be explained. This differential bull gear 78 provided with two pinions 93 is similar to that of the first embodiment except for the reshaped support part 91. The support part 91, which is not a circular disc, consists of only the minimum necessary portions for being supported on the axles 35, supporting the pinions 93, and being joined with the ring gear part 90, thereby being lightweight and saving costs.

Opposite toothed narrow edges 91$g$ of the support part 91, which are symmetric with respect to the axial center hole 91$a$, mesh with the inner peripheral gear of the ring gear part 90. The center portion of the support part 91 having the axial center hole 91$a$ is extremely narrowed. The portion between the axial center hole 91$a$ and each toothed edge 91$g$ is considerably expanded so as to have the hole 91$b$ for supporting the pinion 93. Corresponding to the number or arrangement of the pinions 93 or for another reason, the edges 91$g$ may be increased, decreased or changed in location. Preferably, the narrowed support part 91 is so elastic as to cause centrifugal biasing force toward the ring gear part 90 for keeping the circular shape of the ring gear part 90 when the edges 91$g$ mesh with the inner peripheral gear of the ring gear part 90.

Figure 13:
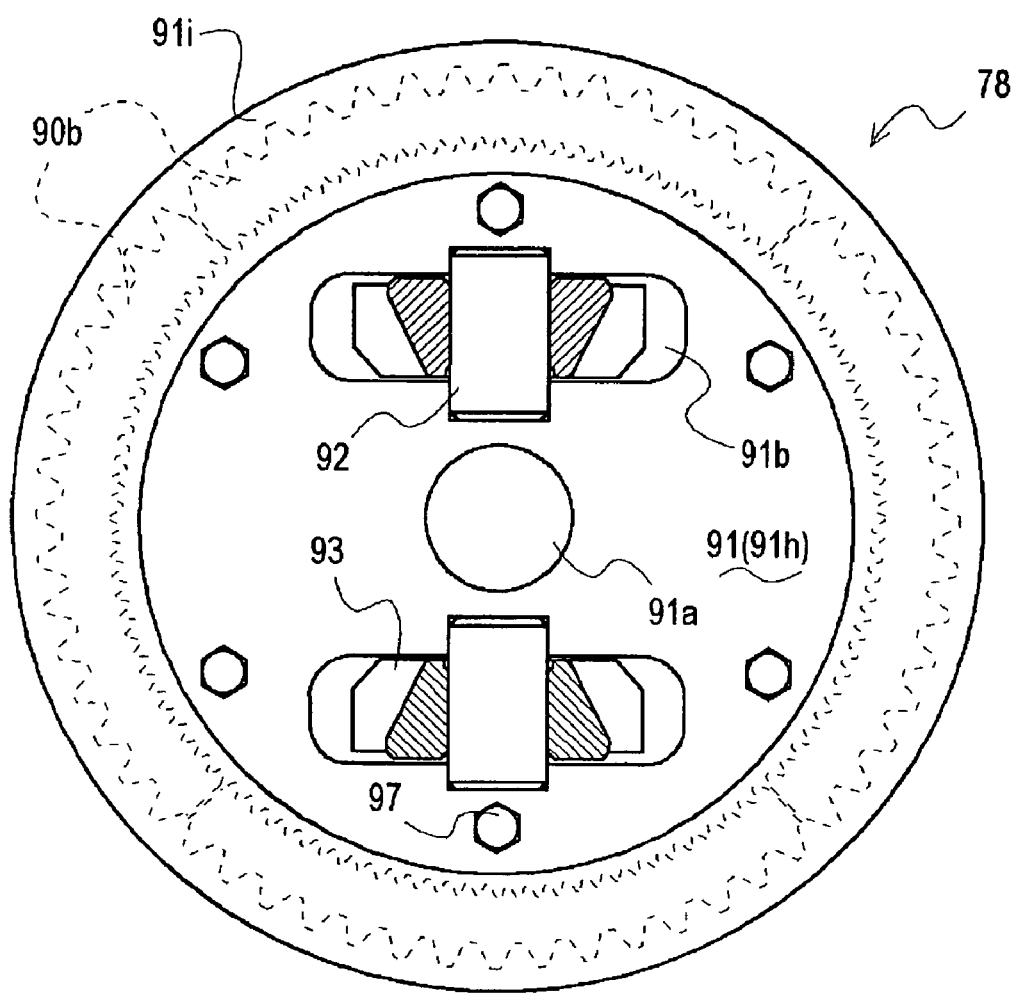
FIG. 13 is a side view of a differential bull gear according to a seventh embodiment of the present invention.
Figure 14:
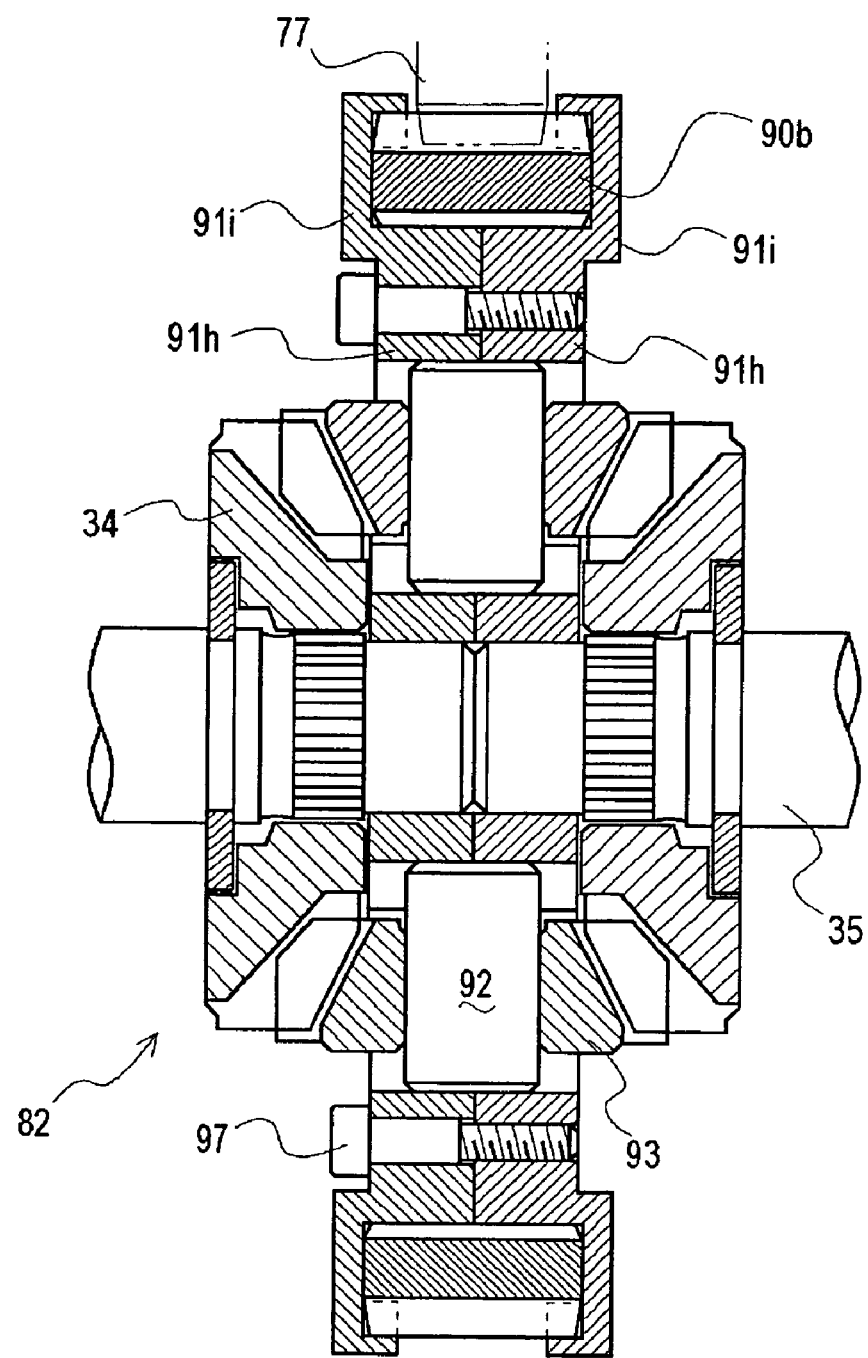
FIG. 14 is a sectional plan view of a differential gear assembly including the differential bull gear according to the seventh embodiment.

Next, a seventh embodiment of the differential bull gear 78 shown in FIGS. 13 and 14 will be explained. The illustrated ring gear part 90 is divisible into pieces 90$b$ similar to that of FIG. 8. The support part 91 is axially divisible into right and left plates 91$h$. The right and left plates 91$h$ are fastened together by bolts 97 so as to constitute the support part 91. The support part 91 supports the pinions 93 and is supported on the axles 35, similar to the above description.

The support part 91 has an outer peripheral gear to mesh with the inner peripheral gear of the ring gear part 90. Similar to the retaining portion 91$d$ of the support part 91 shown in FIG. 9, each plate 91$h$ has a retaining portion 91$i$ extended from its axial outer end surface along the corresponding axial outer surface of the ring gear part 90. The retaining portion 91$i$ is toothed to mesh with the outer peripheral gear of the ring gear part 90. By joining the plates 91$h$ for making the support part 91, the opposite retaining portions 91$i$ of the plates 91$h$ form an annular hole therebetween so as to incorporate the ring gear part 90. The pinion 77 is inserted into a gap between outer peripheral surfaces of the retaining portions 91$i$ of the joined plates 91$h$ so as to mesh with the outer peripheral gear of the ring gear part 90.

For coupling the ring gear part 90 and the support part 91, the ring gear part 90 is engaged into a recess formed by the retaining portion 91*i* of one plate 91*h*. Then, the other plate 91*h* is joined to the plate 91*h* engaging with the ring gear part 90, whereby the two retaining portions 91*i* fittingly cover the opposite axial end surfaces of the ring gear part 90 so as to prevent the ring gear part 90 from axial movement.

Incidentally, the dividable ring gear part 90 according to each of the third to seventh embodiments may alternatively be a single undividable member.

The concept underlying the differential bull gear 78 constituted by the joined ring gear part 90 and the support part 91 is to make a member from inexpensive material while keeping high strength in its frictional (contacting) portion. The same concept is applicable for making HST members having sliding portions, such as a center section, pistons and a movable swash plate. In this regard, as for the HST 25, the center section 38 shown in FIG. 15 and the movable swash plate 45 shown in FIG. 16 will be explained.

As mentioned above, the center section 38 has the surfaces 38*a* and 38*b*, onto which the cylinder block 40 of the hydraulic motor 36 and the cylinder block 44 of the hydraulic pump 37 are slidably rotatably mounted. While the center section 38 is economically made from low-density sintered powder metal or the like, the surfaces 38*a* and 38*b* are coated with material having a low coefficient of friction and high abrasive resistance so as to enhance durability of the center section 38 and ensure smooth sliding of the cylinder blocks 40 and 44 on the surfaces 38*a* and 38*b*. The center section 38, if it is made from sintered powder metal, is so porous as to cause insufficient lubrication on the surfaces 38*a* and 38*b*. By coating the surfaces 38*a* and 38*b*, the pores opening on the surfaces 38*a* and 38*b* are filled up so as to ensure sufficient lubrication thereon. For example, ceramic material and PVD (physical vapor deposition) can be used as a material and method for coating the surfaces 38*a* and 38*b*.

Figure 16:
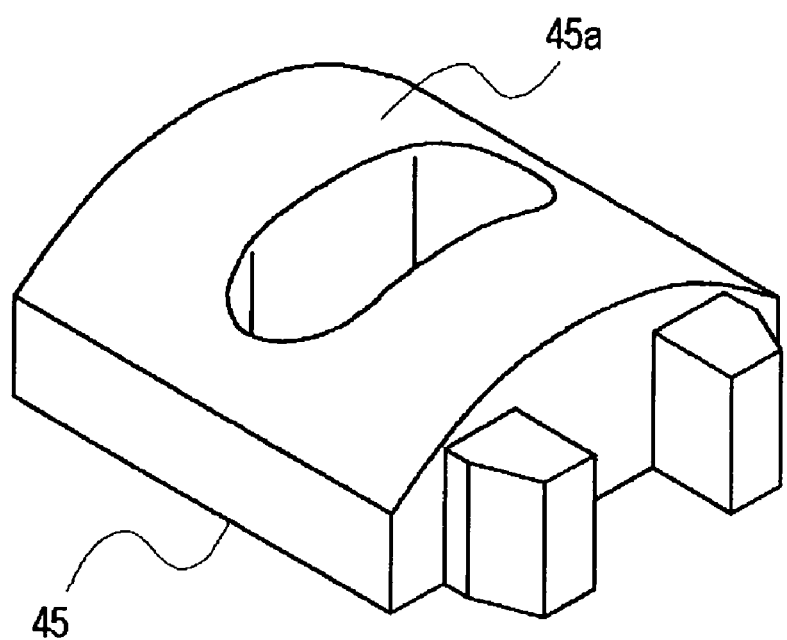
FIG. 16 is a perspective view of a movable swash plate for the hydraulic stepless transmission in the transaxle shown in FIGS. 2 and 3.

While the movable swash plate 45, pistons 39 and 43, and cylinder blocks 40 and 44 are made of economic material, the slide surface 45*a* of the movable swash plate 45 shown in FIG. 16 may be coated with suitable material as mentioned above, and the pistons 39 and 43 and the cylinder blocks 40 and 44 may be coated on their surfaces similarly.

Next, some embodiments of the breather 101 will be explained with reference to FIGS. 17 to 23. A vertical hole 33*c* penetrates an upright portion 33*d* of the upper housing member 33*a* of the housing 33 just above the oil tank 100 shown in FIG. 3. Referring to a breather 101 shown in FIG. 17, an elastic valve housing 103 is inserted downward into the hole 33*c* so as to be elastically filling the hole 33*c*. A cover 104 is placed on the top of the valve housing 103 upwardly projecting from the upright portion 33*d* and surrounding the upright portion 33*d* with a horizontal annular gap between the vertical outer side surface of the upright portion 33*d* and the bottom edge of the cover 104. Therefore, the cover 104 covering the valve housing 103 and the upright portion 33*d* of the upper housing member 33*a* is open downward to the open air so as to prevent dust from entering the oil tank 100.

The valve housing 103 is formed with a top flange portion 103*h*. In the valve housing 103 is bored a downwardly open vertical air passage 103*a* in which a ball valve 106 is vertically movably disposed. The top flange portion 103*h* of the valve housing 103 is partly cut away so as to form a substantially horizontal and upwardly open air passage 103*b* between the cover 104 and the valve housing 103. The air passage 103*b* is connected to the air passage 103*a* through an upper orifice 103*f*, covered at its open top with the cover 104, and open sideward toward the downwardly open space in the cover 104.

The top of the cover 104 is so high apart from a top surface of the upright portion 33*d* so as to ensure an air passage in the cover 104 between the sideward opening of the air passage 103*b* and the downward opening of the cover 104. A portion of the cover 104 opposite to the sideward opening of the air passage 103*b* is downwardly stepped so as to engage with the flange portion 103*h* of the valve housing 103 and abut against the top surface of the upright portion 33*d*, thereby firmly engaging with the valve housing 103 and the upper housing member 33*a* and preventing air leakage.

The valve housing 103 and the cover 104 are made of elastic material, such as rubber or synthetic resin, so that the valve housing 103 is tightly fitted to the upper housing member 33*a* in the hole 33*c*, and the cover 104 is tightly fitted to the valve housing 103 and the upper housing member 33*a*, thereby sealing oil in the oil tank 100 and preventing air leakage. A vertically cylindrical reinforcing member 105 made of metal or the like is buried in the valve housing 103 surrounding the air passage 103*a* so as to compensate for softness of the valve housing 103. The ball valve 106 may be made of either hard material such as steel or soft material such as rubber corresponding to different situations. The ball valve 106, if made of soft material, may be further tightly fitted on each of the valve seats 103*c* and 103*d*, so that, particularly when the upper housing member 33*a* is vertically reversed, the ball valve 106 fitted on the valve seat 103*c* surely shut out the orifice 103*f* from the valve chamber so as to enhance the certainty of prevention of oil leakage.

The vertically middle portion of the air passage 103*a* is diametrically larger than the upper and lower portions thereof, thereby forming an upper step 103*c* between the upper and middle portions, and a lower step 103*d* between the lower and middle portions. The vertically middle portion of the air passage 103*a* is provided as a valve chamber in which the ball valve 106 is vertically movably disposed. The upper and lower steps 103*c* and 103*d* serve as valve seats for the ball valve 106. The lower step 103*d* is partly notched to form a lower orifice 103*e* opening into the housing 33.

When the housing 33 is normally arranged in its vertical direction, the ball valve 106 abuts against the lower step 103*d* so that the valve chamber in the valve housing 103 communicates with the air above oil level of the oil tank 100 in the housing 33 through only the orifice 103*e*, thereby breathing the air from the housing 33. If the air pressure in the housing 33 excessively arises, the ball valve 106 is pushed up apart from the step 103*d* so as to increase the outward airflow.

If the housing 33 is vertically reversed for some reason, such as arranging parts into the housing 33, the ball valve 106 falls to abut against the step 103*c* so as to completely block the valve chamber from the orifice 103*f* below the valve chamber, thereby preventing oil from leaking out from the housing 33. The breather 101 prevents oil leakage in assembly facilities and during maintenance of the transaxle 1.

FIGS. 18 to 23 illustrate various modified breathers 101. Each of the modified breathers 101 has some common elements, i.e., the air passage 103*a* serving as a valve chamber, the valve 106 in the valve chamber, the upper and lower valve seats 103*c* and 103*d* with the valve 106 therebetween, and the upper and lower orifices 103*f* and 103*e* with the upper and lower valve seats 103*c* and 103*d* therebetween. The common important point ensured by all the modified breathers 101 is that, while under normal conditions, the lower orifice 103e is constantly open into the housing 33, the upper orifice 103f is constantly open to the open air, and the valve 106 is fitted onto the lower valve seat 103d opening the orifice 103e to the valve chamber, but when housing 33 is flipped vertically, valve 106 becomes fitted to the valve seat 103c to completely shut the orifice 103f from the valve chamber thereby preventing oil in the housing 33 from leaking out through the breather 101.

Figure 17:
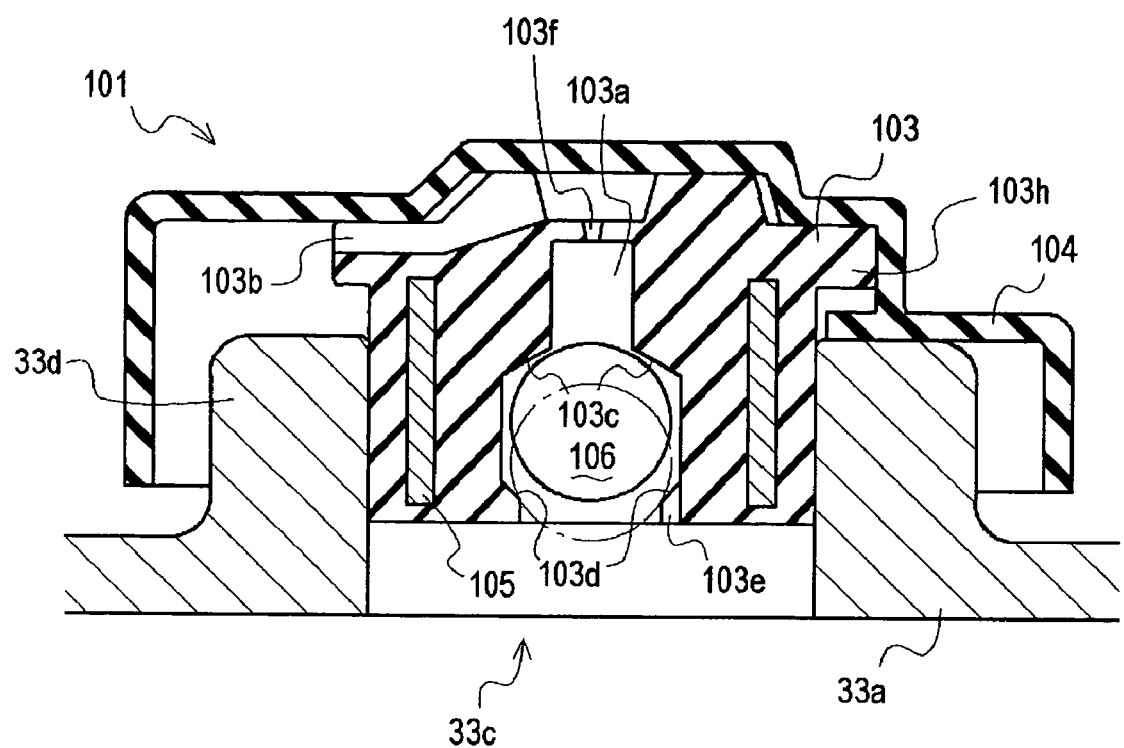
FIGS. 17 to 23 are sectional side views of some types of breathers for the transaxle shown in FIG. 3.
Figure 18:
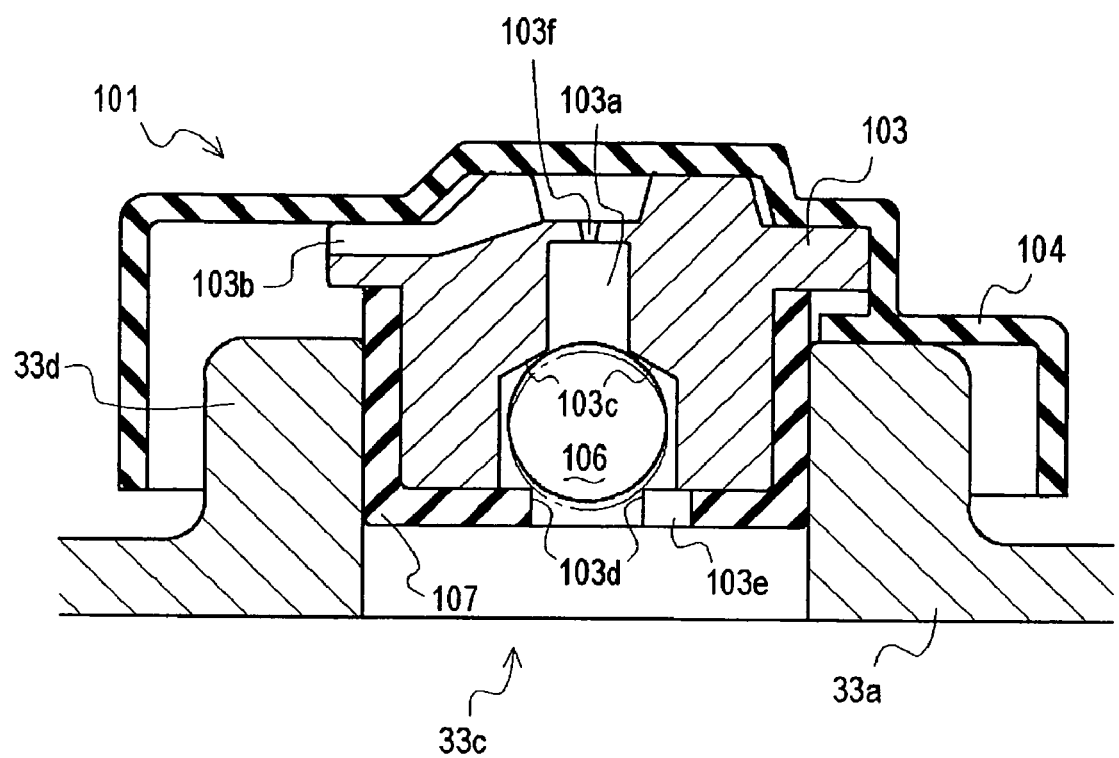

A breather 101 shown in FIG. 18 has a plastic valve housing 103 having required rigidity and strength without the reinforcing member 105. Similar to the valve housing 103 of FIG. 17, the valve housing 103 of FIG. 18 is provided with the vertical air passage 103a opening into the housing 33, the sideward air passage 103b opening to the open air, the orifice 103f connecting the air passages 103a and 103b, the ball valve 106 in the air passage 103a, and the top flange portion 103h.

A cup-like elastic seal member 107 made of elastic material such as rubber or synthetic resin is tightly filled in the vertically cylindrical gap between the upright portion 33d and the valve housing 103 so as to seal the gap. The seal member 107 may be bonded to the valve housing 103 so as to be integrated with the valve housing 103. The horizontal bottom portion of the seal member 107 is fitted to the bottom surface of the valve housing 103. The center bottom portion of the seal member 107 is vertically bored throughout so as to form the lower step (lower valve seat) 103d and orifice 103e at the bottom opening of the air passage 103a. The cover 104 made of elastic material is similar to that of FIG. 17, and tightly fitted to the valve housing 103 and the upper housing member 33a, similarly.

Figure 19:
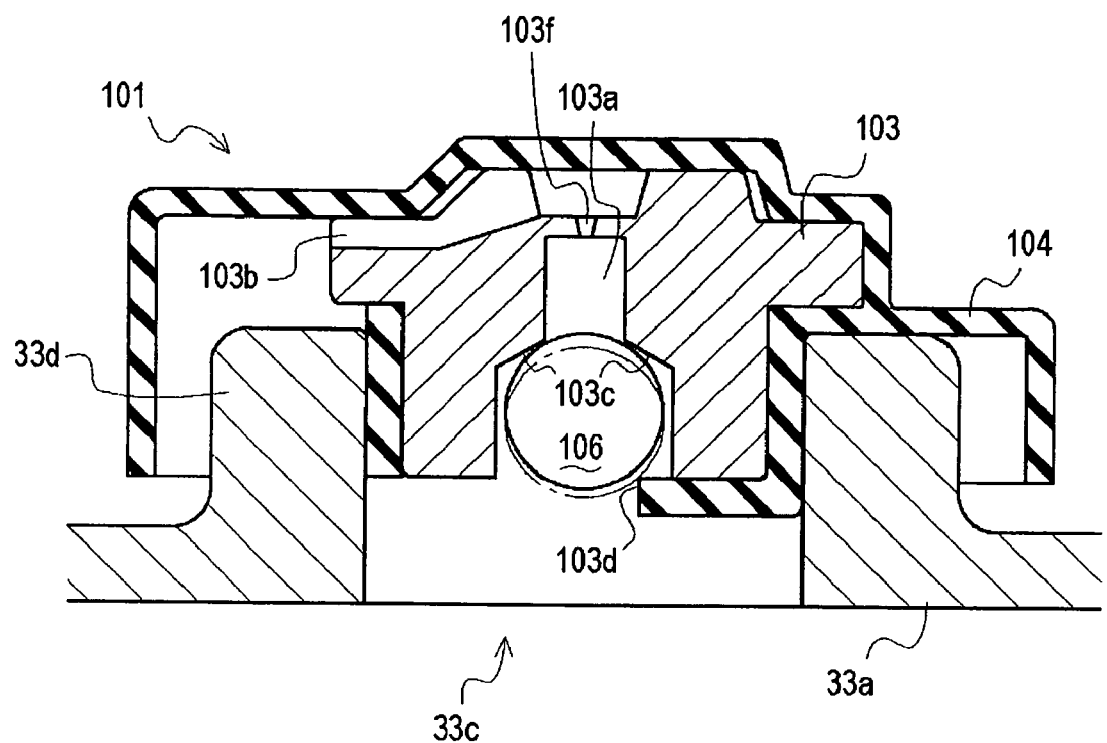

A breather 101 of FIG. 19 is modification of the breather 101 of FIG. 18, wherein the elastic cover 104 is further integrally formed with an expanding portion functioning similar to the seal member 107 shown in FIG. 18. That is, the expanding portion of the cover 104 is vertically cylindrical so as to be tightly filled in the vertical gap between the valve housing 103 and the upright portion 33d. A bottom edge of the expanding portion of the cover 104 is partly extended horizontally so as to prevent the ball valve 106 from falling out from the valve housing 103. This extended bottom edge of the cover 104 also serves as the lower valve seat 103d. The valve chamber of the air passage 103a is widely open downward into the housing 33, however, the ball valve 106 is normally placed on the valve seat 103d while ensuring a small gap between the ball valve 106 and the open bottom peripheral edge of the air passage 103a. This small gap serves as the lower orifice 103e.

Each of breathers 101 shown in FIGS. 20 to 23 uses elastic valve housings 103 in which the reinforcing member 105 is buried, similar to that of FIG. 17. However, instead of the elastic cover 14, each of the elastic valve housings 103 is formed with a flange portion 103i horizontally extended from its upper portion above the upright portion 33d. An outer peripheral end of the flange portion 103i is extended downward so as to elastically clamp the upright portion 103d with a main central body of the valve housing 103 in the hole 33c, whereby the valve housing 103 firmly engages with the upper housing member 33a.

Figure 20:
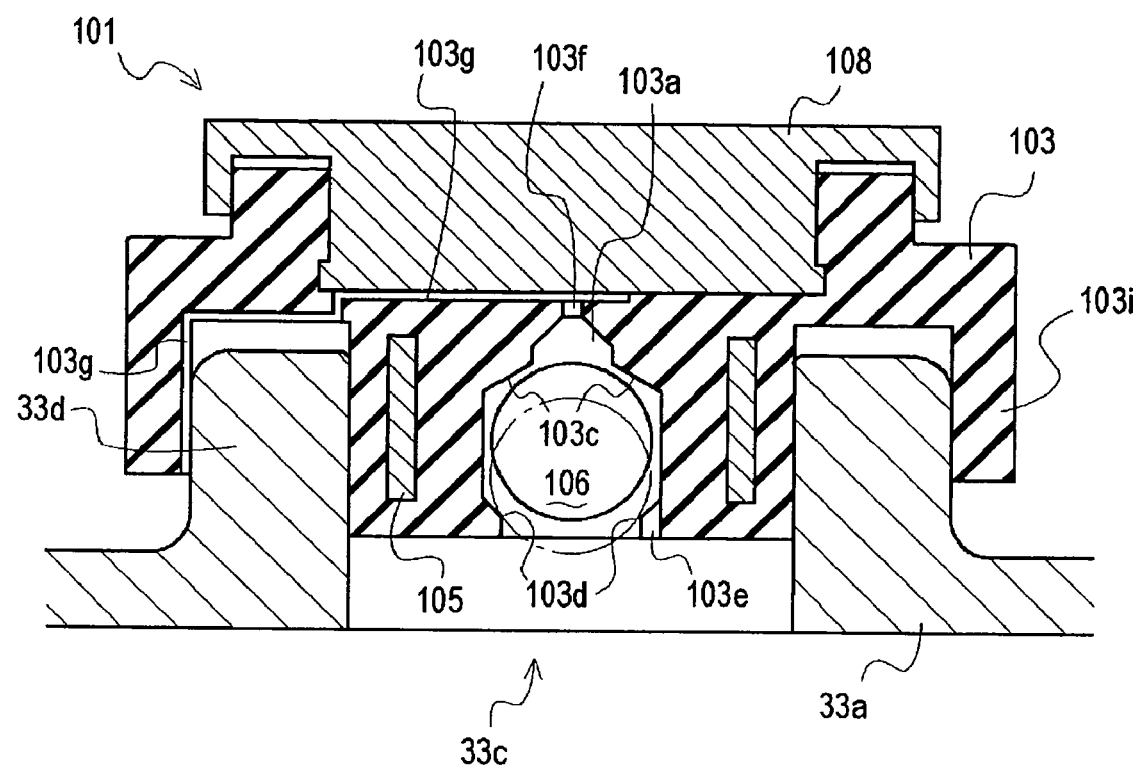
Figure 21:
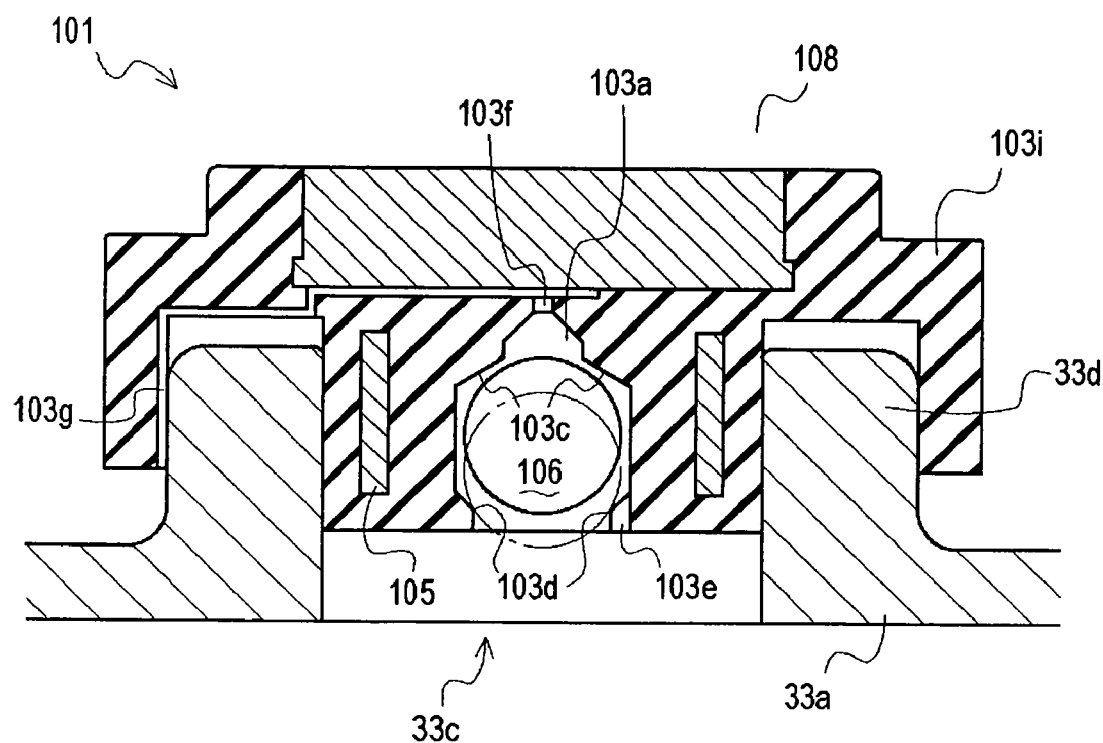

The valve housing 103 used for both the breathers 101 shown in FIGS. 20 and 21 is downwardly recessed at its top. A plastic lid 108 is filled in the top recess of the valve housing 103. A top portion of the lid 108 shown in FIG. 20 is centrifugally horizontally extended over the top peripheral edge of the valve housing 103 surrounding the top recess and extended downwardly at its outer peripheral end so as to clamp the top peripheral edge of the valve housing 103 with the main body of the lid 108 filled in the top recess of the valve housing 103. Alternatively, the lid 108 shown in FIG. 21, fully fitted in the valve housing 103, is leveled at its top surface with the top surface of the valve housing 103.

Each of the valve housings 103 of FIGS. 20 and 21 is formed therein with the vertical air passage 103a with the upper and lower orifices 103f and 103e, similar to the foregoing embodiments. The valve housing 103 is further formed with a groove 103g extended outward from the upper orifice 103f. A horizontal part of the groove 103g directly connected to the orifice 103f is open upward to the top recess of the valve housing 103 and covered at the top opening with the lid 108 filled in the recess. The groove 103g is downwardly stepped from the upwardly open horizontal part thereof and downwardly open at the inner surface of the bent flange portion 103i of the valve housing 103. A downwardly outward opening of the groove 103g is disposed at the bottom edge of the bent flange portion 103i along the outer peripheral surface of the upright portion 33d.

Figure 22:
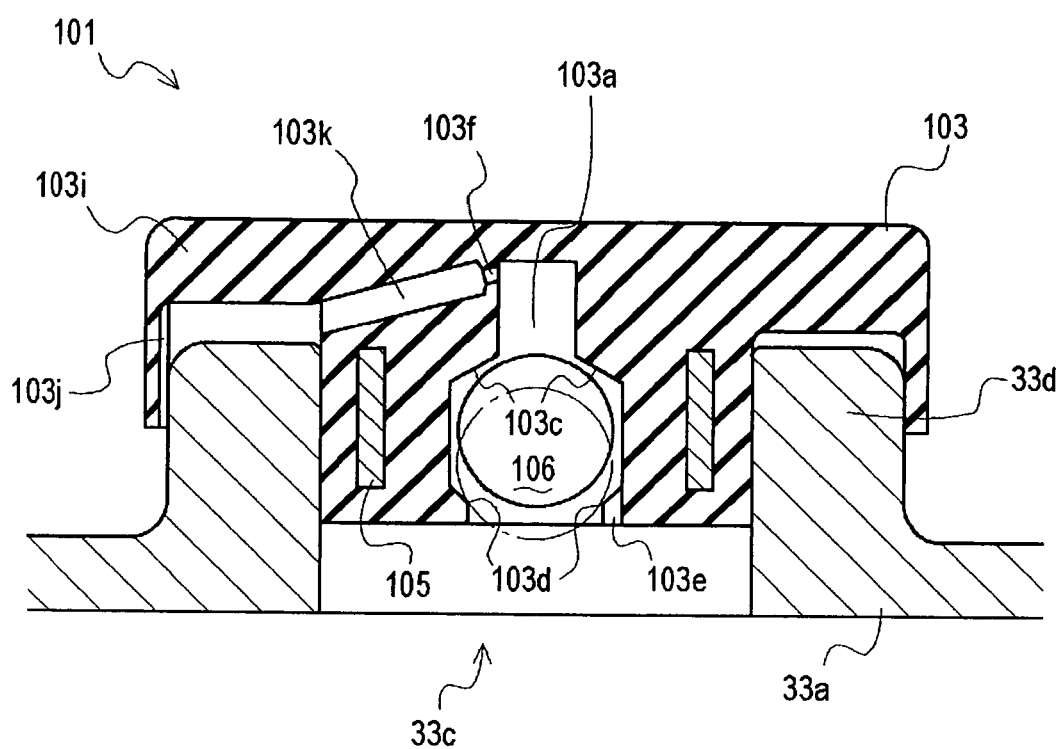
Figure 23:
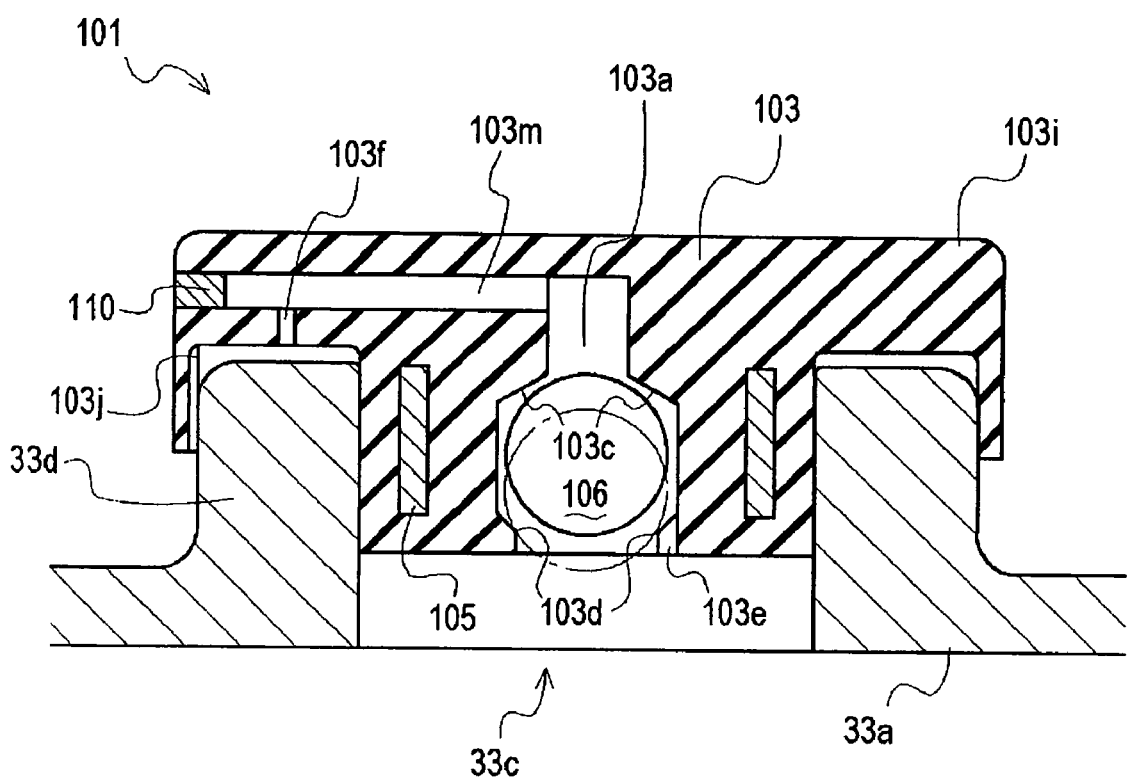

Each of the breathers 101 of FIGS. 22 and 23 is provided with an upwardly exposed valve housing 103 without a covering member such as the cover 104 or the lid 108. The valve housing 103 is formed with a downwardly outward open vertical groove 103j on the inner surface of the vertical peripheral edge of the flange portion 103i along the upright portion 33d. The vertical groove 103j is inwardly open to a space between the horizontal bottom surface of the flange portion 103i and the top surface of the upright portion 33d.

The valve housing 103 shown in FIG. 22 is bored therein with a slanting sideward air passage 103k connected to the top end of the vertical air passage 103a through the upper orifice 103f. The air passage 103k is open to the space between the flange portion 103i and the upright portion 33d, thereby communicating with the outwardly open vertical groove 103j.

The valve housing 103 shown in FIG. 23 is bored therein with a horizontal air passage 103m directly connected to the top end of the vertical air passage 103a. A plug 110 plugs an outward opening of the horizontal air passage 103m. The valve housing 103 is bored therein with the upper orifice 103f, which is vertically downwardly extended from an intermediate portion of the horizontal air passage 103m and open at its bottom end to the space between the flange portion 103i and the upright portion 33d so as to communicate with the outwardly open vertical groove 103j.

While the invention has been described in its preferred embodiments, it is to be understood that the words which have been used are words of description rather than limitation and that changes within the purview of the appended claims may be made without departing from the true scope and spirit of the invention in its broader aspects.

What is claimed is:

1. A bull gear of a differential gear assembly, comprising:
   a ring gear for inputting torque from a transmission; and
   a support member supporting a differential pinion and supported on an axle, the support member transmitting the torque from the ring gear to the axle through the differential pinion, wherein the ring gear and the support member are coupled together so as to be relatively axially shiftable and not-relatively rotatable;
   wherein the ring gear has a toothed outer periphery and a toothed inner periphery, wherein either the toothed outer or inner periphery serves as an input gear for receiving torque from the transmission, and wherein both of the toothed outer and inner peripheries mesh with a toothed portion of the support member so as to couple the ring gear with the support member.

2. The bull gear of a differential gear assembly as set forth in claim 1, the support member having an annular recess into which the ring gear is fitted, wherein the recess has a toothed outer periphery and a toothed inner periphery for meshing with the toothed outer and inner peripheries of the ring gear, respectively.

3. The bull gear of a differential gear assembly as set forth in claim 2, the support member being divisible into halves each of which has the annular recess, wherein the halves are joined to each other so as to fit the ring gear in the mutually facing recesses, thereby forming the support member holding the ring gear.

4. The bull gear of a differential gear assembly as set forth in claim 1, the ring gear having a first surface perpendicular to the axle, and the support member having a second surface to be leveled with the first surface of the ring gear, further comprising:

a retaining member abutting against the first and second surfaces so as to prevent the ring gear and the support member from relatively axially moving; and a screw screwed into either the ring gear or the support member, wherein the retaining member is a washer provided on the screw.

5. The bull gear of a differential gear assembly as set forth in claim 1, wherein the ring gear has a first surface perpendicular to the axle, and the support member has a second surface level with the first surface of the ring gear, and wherein the ring gear is divided into a plurality of pieces, further comprising:

a plurality of retaining members abutting against the first and second surfaces so as to prevent the ring gear and the support member from relatively axially moving.

* * * * *